(12) United States Patent
Shimojou et al.

(10) Patent No.: US 10,993,068 B2
(45) Date of Patent: Apr. 27, 2021

(54) COMMUNICATION CONTROL DEVICE AND COMMUNICATION CONTROL METHOD

(71) Applicant: NTT DOCOMO, INC., Tokyo (JP)

(72) Inventors: Takuya Shimojou, Tokyo (JP); Masayoshi Shimizu, Tokyo (JP); Atsushi Minokuchi, Tokyo (JP); Shigeru Iwashina, Tokyo (JP); Malla Reddy Sama, Munich (DE); Srisakul Thakolsri, Munich (DE); Wolfgang Kiess, Munich (DE); Riccardo Guerzoni, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/325,753

(22) PCT Filed: Jun. 2, 2017

(86) PCT No.: PCT/JP2017/020672
§ 371 (c)(1),
(2) Date: Feb. 15, 2019

(87) PCT Pub. No.: WO2018/034042
PCT Pub. Date: Feb. 22, 2018

(65) Prior Publication Data
US 2019/0182733 A1 Jun. 13, 2019

(30) Foreign Application Priority Data
Aug. 17, 2016 (JP) .............................. JP2016-159985

(51) Int. Cl.
*H04W 36/00* (2009.01)
*H04W 4/00* (2018.01)
(Continued)

(52) U.S. Cl.
CPC ............. *H04W 4/00* (2013.01); *H04W 36/18* (2013.01); *H04W 72/04* (2013.01)

(58) Field of Classification Search
None
See application file for complete search history.

(56) References Cited

U.S. PATENT DOCUMENTS

| 10,536,946 B2 * | 1/2020 | Zhu ..................... H04W 72/048 |
| 2019/0182737 A1 * | 6/2019 | Futaki ................... H04W 36/36 |
| 2019/0191348 A1 * | 6/2019 | Futaki ............... H04W 36/0033 |

OTHER PUBLICATIONS

Nakao, A.; "Virtual Node Project Virtualization Technology for Building New-Generation"; National Institute of Information and Communication Technology, http://www.nict.go.jp/publication/NICTNews/1006/01.html, Jun. 2010 (12 pages).

(Continued)

*Primary Examiner* — Willie J Daniel, Jr.
(74) *Attorney, Agent, or Firm* — Osha Bergman Watanabe & Burton LLP

(57) ABSTRACT

A common C-Plane control node includes a change request acquiring unit that acquires a change request relating to changing of a communication path relating to a UE, a determination unit that determines whether or not the UE has set up the communication path in each of control nodes of a plurality of slices using information included in the change request acquired by the change request acquiring unit, and a communication processing unit that performs a process relating to changing of a communication path while forming a state in which the communication path before change and the communication path after change coexist for each of a plurality of communication paths in a case in which the determination unit determines that the UE has set up the communication path in each of the plurality of slices.

2 Claims, 24 Drawing Sheets

(51) Int. Cl.
H04W 36/18 (2009.01)
H04W 72/04 (2009.01)

(56) References Cited

OTHER PUBLICATIONS

Extended European Search Report issued in the counterpart European Patent Application No. 17841270.6, dated Dec. 20, 2019 (11 pages).
Samsung; "Assignment of CP and UP network functions during an MM procedure"; SA WG2 Meeting #116, S2-164041; Vienna, Austria, Jul. 11-15, 2016 (6 pages).
Ericsson; "Principles of Network Slicing for 5G"; 3GPP TSG-RAN WG3 #93, R3-161888; Gothenburg, Sweden, Aug. 22-26, 2016 (5 pages).
Written Opinion of the International Searching Authority issued in PCT/JP2017/020672 dated Aug. 1, 2017 (4 pages).
International Preliminary Report on Patentability from PCT/JP2017/020672 dated Feb. 28, 2019 (2 pages).
Office Action in counterpart Chinese Patent Application No. 201780050423.6 dated Oct. 9, 2020 (13 pages).
Office Action issued in European Application No. 17841270.6; dated Feb. 15, 2021 (6 pages).

\* cited by examiner

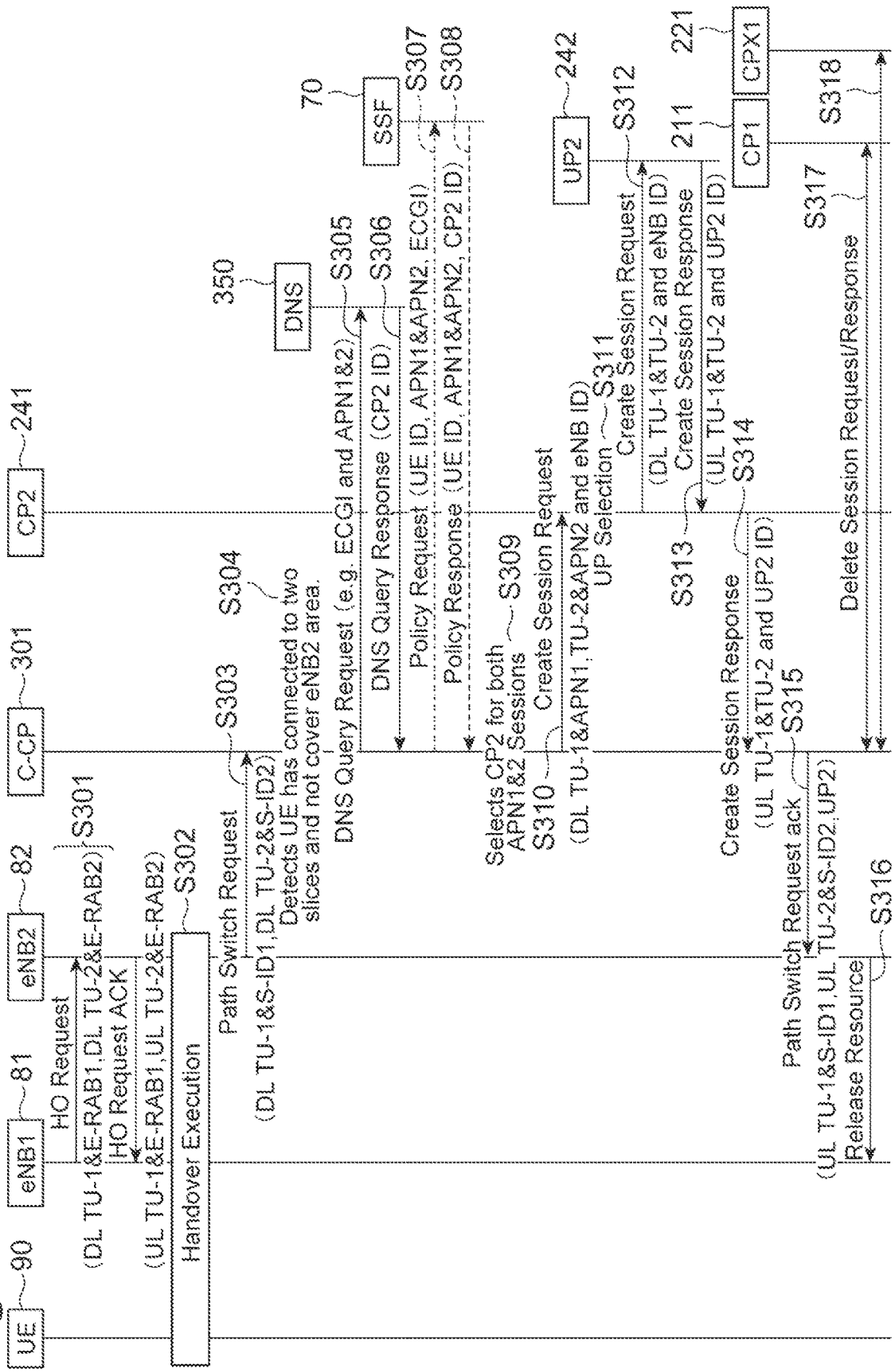

| location | Service type | USED SLICE AND CONFIGURATION NODE |
|---|---|---|
| Location#1 | MBB | Slice1 (UP1) |
| Location#1 | V2X | Slice2 (UPX1) |
| Location#2 | MBB | Slice3 (CP2,UP2) |
| Location#2 | V2X | Slice3 (CP2,UP2) |
| Location#3 | MBB | Slice4 (CPY,UPY) |
| Location#3 | V2X | Slice4 (CPY,UPY) |

(B)

| location | USABLE SLICE AND CONFIGURATION NODE |
|---|---|
| Location#1 | Slice1 (UP1) |
| Location#2 | Slice2 (UPX1) |
| Location#3 | Slice3 (CP2,UP2) |
| | Slice4 (CPY,UPY) |

(C)

| Service type | USED SLICE PRIORITY ORDER |
|---|---|
| MBB | Slice1, Slice3, Slice4 |
| V2X | Slice2, Slice3, Slice4 |

COMMUNICATION CONTROL DEVICE AND COMMUNICATION CONTROL METHOD

TECHNICAL FIELD

The present invention relates to a communication control device and a communication control method.

BACKGROUND ART

In a network system using a conventional virtualization technology, by using a virtualization technology disclosed in Non-Patent Literature 1, hardware resources are virtually divided, and a slice that is a virtual network logically created on a network infrastructure is created. Then, by assigning services to slices, the services can be provided for a user terminal used by a user using networks of independent slices. In this way, in a case in which slices are assigned to services having various required conditions, required conditions of individual services can be easily satisfied, and signaling processing and the like thereof can be reduced. In addition, in a case in which a service assigned to each slice is used by a user terminal, by disposing a communication path relating to the user terminal at a control node disposed in the slice, user data is transmitted and received through the communication path.

CITATION LIST

Non Patent Literature

[Non-Patent Literature 1] Nakao Akihiro, "Virtual Node Project-Virtualization Technology intended for New-Generation Networks," "online," June 2010, National Institute of Information and Communications Technology, "retrieved on Aug. 10, 2016," the Internet http://www.nict.go.jp/publication/NICT-News/1006/01.html

SUMMARY OF INVENTION

Technical Problem

Meanwhile, while a service assigned to each slice is used by a user terminal, there are cases in which a communication path relating to the user terminal needs to be changed in accordance with a certain situation. Particularly, in a case in which this user terminal accesses a plurality of slices and transmits and receives user data, changing of the communication path while the service is used has not been taken into account conventionally.

The present invention is realized in consideration of the description presented above, and an object thereof is to provide a communication control device and a communication control method capable of changing communication paths disposed for a plurality of slices while services assigned to the plurality of slices are used.

Solution to Problem

In order to achieve the object described above, according to one embodiment of the present invention, there is provided a communication control device performing communication control relating to a user terminal that sets up a communication path for each control node of one or a plurality of slices that are virtualized networks created on a network infrastructure and transmits/receives user data through the communication paths, the communication control device including: a change request acquiring unit that acquires a change request relating to changing of a communication path relating to the user terminal; a determination unit that determines whether or not the user terminal relating to the change request has set up the communication path for each of control nodes of the plurality of slices using information included in the change request acquired by the change request acquiring unit; and a communication processing unit that performs a process relating to changing of a communication path while forming a state in which a communication path before change and the communication path after change coexist for each of a plurality of communication paths set up for the control nodes of the plurality of slices in a case in which the determination unit determines that the user terminal relating to the change request has set up a communication path for each of the plurality of slices.

In addition, a communication control method according to one embodiment of the present invention is a communication control method using a communication control device performing communication control relating to a user terminal that sets up a communication path for each control node of one or a plurality of slices that are virtualized networks created on a network infrastructure and transmits/receives user data through the communication path, the communication control method including: a change request acquiring step of acquiring a change request relating to changing of a communication path relating to the user terminal; and a communication processing step of performing a process relating to changing of a communication path while forming a state in which the communication path before change and the communication path after change coexist for each of a plurality of communication paths set up for the control nodes of the plurality of slices in a case in which it is determined that the user terminal relating to the change request has set up the communication path for each of the plurality of slices from information included in the change request acquired in the change request acquiring step.

According to the communication control device and the communication control method described above, in a case in which the user terminal relating to a change request transmitted to the communication control device has set up a communication path for each of control nodes of a plurality of slices, a process relating to changing of the communication path is performed while a state in which the communication path before change and the communication path after change coexist is formed for each of a plurality of communication paths. For this reason, the user terminal can maintain a state in which user data can be transmitted and received using the communication path before change or the communication path after change, and accordingly, changing of communication paths set up with a plurality of slices can be realized while using services assigned to a plurality of slices.

Advantageous Effects of Invention

According to the present invention, a communication control device and a communication control method capable of changing communication paths disposed for a plurality of slices while services assigned to the plurality of slices are used are provided.

BRIEF DESCRIPTION OF DRAWINGS

FIG. 12 is a sequence diagram illustrating a process relating to the third case.

FIG. 13 is a diagram illustrating an example of information maintained by a DNS server and an SSF.

DESCRIPTION OF EMBODIMENTS

Hereinafter, embodiments of the present invention will be described in detail with reference to the drawings. In description of the drawings, the same reference signs will be assigned to the same elements, and duplicate description thereof will be omitted.

First Embodiment: System Having Common C-Plane Control Node

Figure 1:
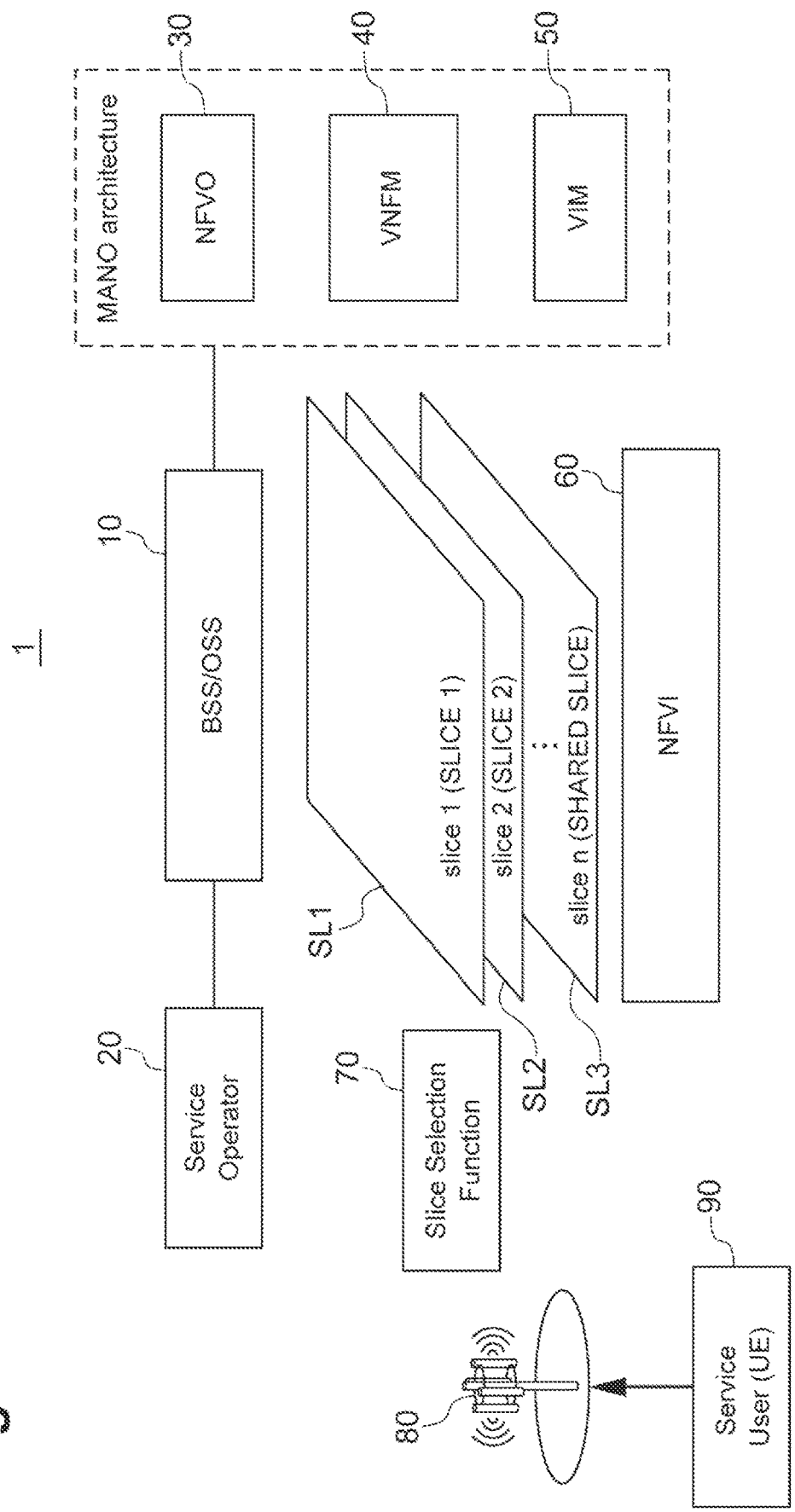
FIG. 1 is a diagram illustrating the configuration of a system according to an embodiment of the present invention.

FIG. 1 illustrates the configuration of a system (communication system) 1 configuring a virtualized network. The system 1 illustrated in FIG. 1, by assigning a service to a slice that is a virtual network, provides a network service to user equipment (UE) 90 that is a terminal used by a service user (user terminal). A slice is a virtual network or a service network that is logically created on a network infrastructure by virtually dividing resources of links and nodes of a network device and combining the separate resources, and slices divide the resources and thus do not interfere with each other. A network service is a service using network resources such as a communication service (a dedicated line service or the like) or an application service (moving image distribution or a service using a sensor device such as an embedded device). In addition, the UE 90, for example, is a terminal device having a communication function such as a smartphone.

As illustrated in FIG. 1, the system 1 is configured to include a business support system/operations support system (BSS/OSS) 10, a service operator (SO) 20, an NFVO 30, a VNFM 40, and a virtualized infrastructure management (VIM) 50. In addition, the system 1 is configured to include a network functional virtualization (NFV) infrastructure (NFVI) 60, a slice selection function (SSF) 70, an eNodeB (eNB) 80, and UE 90. Among these, the NFVO 30, the VNFM 40, and the VIM 50 are functions of a Management & Orchestration (MANO) architecture standardized as ETSI NFV-ISG Such constituent elements configure a network that becomes a core of the system 1. Constituent elements required to transmit/receive information to/from each other are connected using wires, and thus the transmission/reception of information can be performed.

The system 1 according to this embodiment provides a communication function for a mobile communication terminal using a virtual server that operates on a virtual machine realized on a physical server. In other words, the system 1 is a virtual mobile communication network. The communication function executes a communication process according to the communication function using the virtual machine and thus is provided for the mobile communication terminal.

The NFVI 60 represents a network formed from physical resources (a node group) configuring a virtualized environment. These physical resources conceptually include computation resources, storage resources and transmission resources. More specifically, these physical resources are configured to include nodes such as physical servers and switches that are physical servers performing a communication process in the system 1. A physical server is configured to include a CPU (a core; a processor), a memory, and a storage means such as a hard disk. Generally, a plurality of nodes such as a physical server configuring the NFVI 60 and the like are disposed together at a base such as a data center (DC). In the data center, the arranged physical servers are able to communicate through an internal network of the data center and are configured to be able to transmit/receive information to/from each other. In addition, a plurality of data centers are disposed in the system 1. The data centers are able to communicate with each other through a network, and physical servers disposed at different data centers can transmit/receive information to/from each other through the network.

The service operator (SO) 20 is a device which requests creation of a network used for providing a network service and, for example, is a terminal device (for example, a personal computer or the like) of a company providing services for various users using a virtual network.

The BSS/OSS 10 is a node that performs service management in the system 1 and performs directions relating to a communication function in the system 1. For example, the BSS/OSS 10 may direct the NFVO 30 to add a new network service. In addition, the BSS/OSS 10 may be operated by a communication company relating to the system 1.

The NFVO 30 is a total management node (a functional entity) managing a total virtual network (slice) built on an NFVI 60 that is a physical resource. The NFVO 30 receives a direction from the BSS/OSS 10 and performs a process according to the direction. The NFVO 30 performs management over the total virtualization network built using the infrastructure and physical resources of a mobile communication network of a network service. The NFVO 30 realizes a network service provided by a virtual network at an appropriate place in association with the VNFM 40 and the VIM 50. For example, the NFVO 30 performs management of a lifecycle of a network service (more specifically, for example, creation, update, scale control, and event collection of a network service), resource management over an entire mobile communication network, in other words, management of distribution, reservation, and assignment of resources, and management of service instances, and management of policies relating to resource management (more specifically, for example, reservation and assignment of resources and optimal arrangement based on geography, laws, and the like).

The VNFM 40 is a virtual communication function managing node (a functional entity) that adds a function of configuring a network service to the NFVI 60 that becomes physical resources (node). A plurality of VNFMs 40 may be disposed in the system 1.

The VIM 50 is a physical resource managing node (a functional entity) managing each physical resource (node) in the NFVI 60. More specifically, the VIM 50 performs management of assignment, update, and recovery of resources, association between physical resources and virtualized networks, and management of lists of hardware resources and SW resources (hypervisors). Generally, the VIM 50 performs management for each data center (station). The management of physical resources is performed in a system according to the data center. As management systems of data centers (a system for realizing management resources), there are types including OPENSTACK, vCenter, and the like. Generally, VIMs 50 are disposed for each management system of the data center. In other words, a plurality of VIMs 50 respectively managing physical resources of the NFVI 60 in different systems are included. In addition, units of physical resources managed in different management systems may not be necessarily units of data centers.

In addition, the NFVO 30, the VNFM 40, and the VIM 50 are realized by executing programs on a physical server device (here, the realization is not limited to virtualization and may be realized on virtualization after a management system is divided). The NFVO 30, the VNFM 40, and the VIM 50 may be either realized by different physical server apparatuses or realized by the same server apparatus. The NFVO 30, the VNFM 40, and the VIM 50 (programs for realizing these) may be provided from different vendors.

When a network service creation request is received from the BSS/OSS 10, the NFVO 30 requests the VIM 50 to secure resources for slices (slices SL1, SL2, and the like). When the VIM 50 secures resources of server apparatuses and switches configuring the NFVI 60, the NFVO 30 defines a slice for the NFVI 60.

In addition, when the VIM 50 is caused to secure resources in the NFVI 60, NFVO 30 stores information defining a slice for the NFVI 60 in a table stored by the NFVO 30. Then, the NFVO 30 requests the VNFM 40 to install software for realizing functions required for the network service. In response to the installation request, the VNFM 40 installs the software described above in the NFVI 60 (nodes such as a server apparatus, a switch device, a router device, and the like) secured by the VIM 50.

When the software is installed by the VNFM 40, the NFVO 30 performs mapping between slices and network services in the table stored by the NFVO 30.

Figure 2:
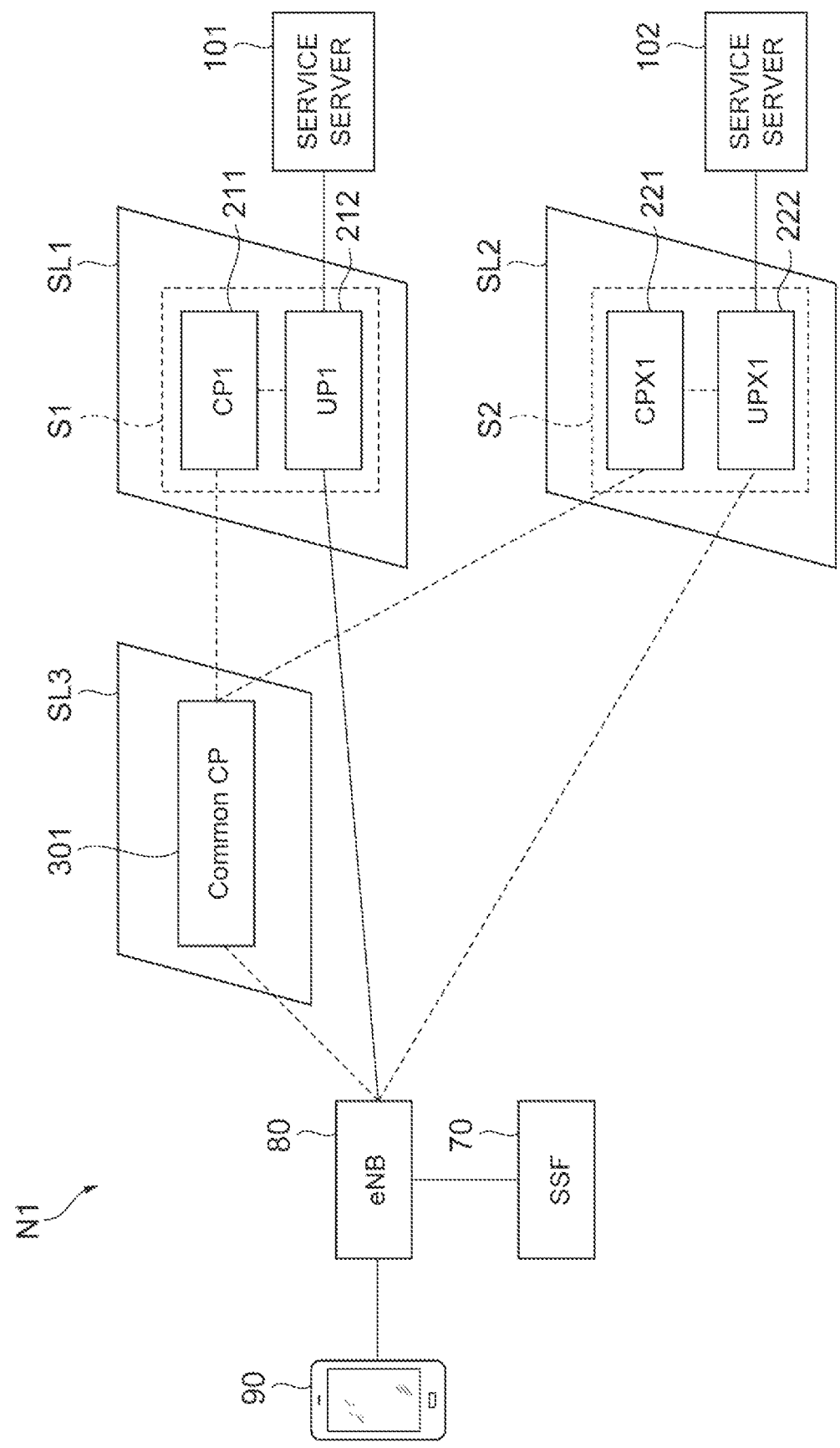
FIG. 2 is a diagram illustrating a relation between slices and a core network.

More specifically, as illustrated in FIG. 2, the NFVO 30 creates a slice SL1 (a first slice) that is a slice used for a first service (a service S1), a slice SL2 (a second slice) that is a slice used for a second service (a service S2), and a slice SL3 (a third slice) that is a slice having a function as a control device relating to control of the slice SL1 or the slice SL2. The NFVO 30 assigns the service S1 to the slice SL1 and assigns the service S2 to the slice SL2. A function for executing the service S1 and the service S2 is implemented by performing a process on the basis of a signal and the like transmitted from the slice SL3 or performing a process of requesting the slice SL3, in which a node having a function as a communication control device to be described later is disposed, to provide information as is necessary.

In this way, the slice SL1, the slice SL2, and the slice SL3 are built into the system 1 such that they are able to logically communicate with each other.

In addition, in the slice SL1 providing the service S1, a first C-Plane control node (CP1) 211 and a first U-Plane control node (UP1) 212 are included in this embodiment. The first C-Plane control node 211 transmits/receives control signals relating to establishment and disconnection of a communication path when the service S1 is provided for a user and the like. In addition, the first U-Plane control node 212 transmits and receives user data by due to disposition of a communication path when the service S1 is provided for a user and setting up a communication path for the service server 101 providing services. In addition, in the slice SL2 providing the service S2, a second C-Plane control node (CPX1) 221 and a second U-Plane control node (UPX1) 222 are included. The second C-Plane control node 221 transmits/receives control signals relating to establishment and disconnection of a communication path when the service S2 is provided for a user and the like. In addition, the second U-Plane control node 222 transmits and receives user data by arranging a communication path when the service S2 is provided for a user and setting up a communication path for the service server 102 providing services. The correspondence relation between the slices and the services is one example and may be appropriately changed. In other words, nodes used for providing a plurality of services may be assigned to one slice.

In addition, in the drawings and the like, "CP1 and UP1" and "CPX1 and UPX1" may be represented differently. A difference between denotations of the nodes "CP" and "CPX" represent services to which the nodes are applied. In other words, CP1 and the like being nodes applied to the service S1, and the CPX1 and the like being nodes applied to the service S2 is schematically indicated. In addition, there are nodes represented as "CPY and UPY." These schematically represent nodes that are not originally assumed to be not inherently applied to the service S1 or the service S2.

In the slice SL3 illustrated in FIG. 2, a common C-Plane control node (common CP) 301 is included. The common C-Plane control node 301 has a function for controlling the first C-Plane control node 211 of the service S1, the second C-Plane control node 221 of the service S2, and the like and executes processes relating to establishment and disconnection of a communication path between a user and each slice on the basis of a direction from the user side.

In addition, instead of being realized by assigning a function to the slice SL3, the common C-Plane control node 301 may be realized by a device having hardware. In such a case, slices created by the NFVO 30 are the slices SL1 and SL2.

Figure 3:
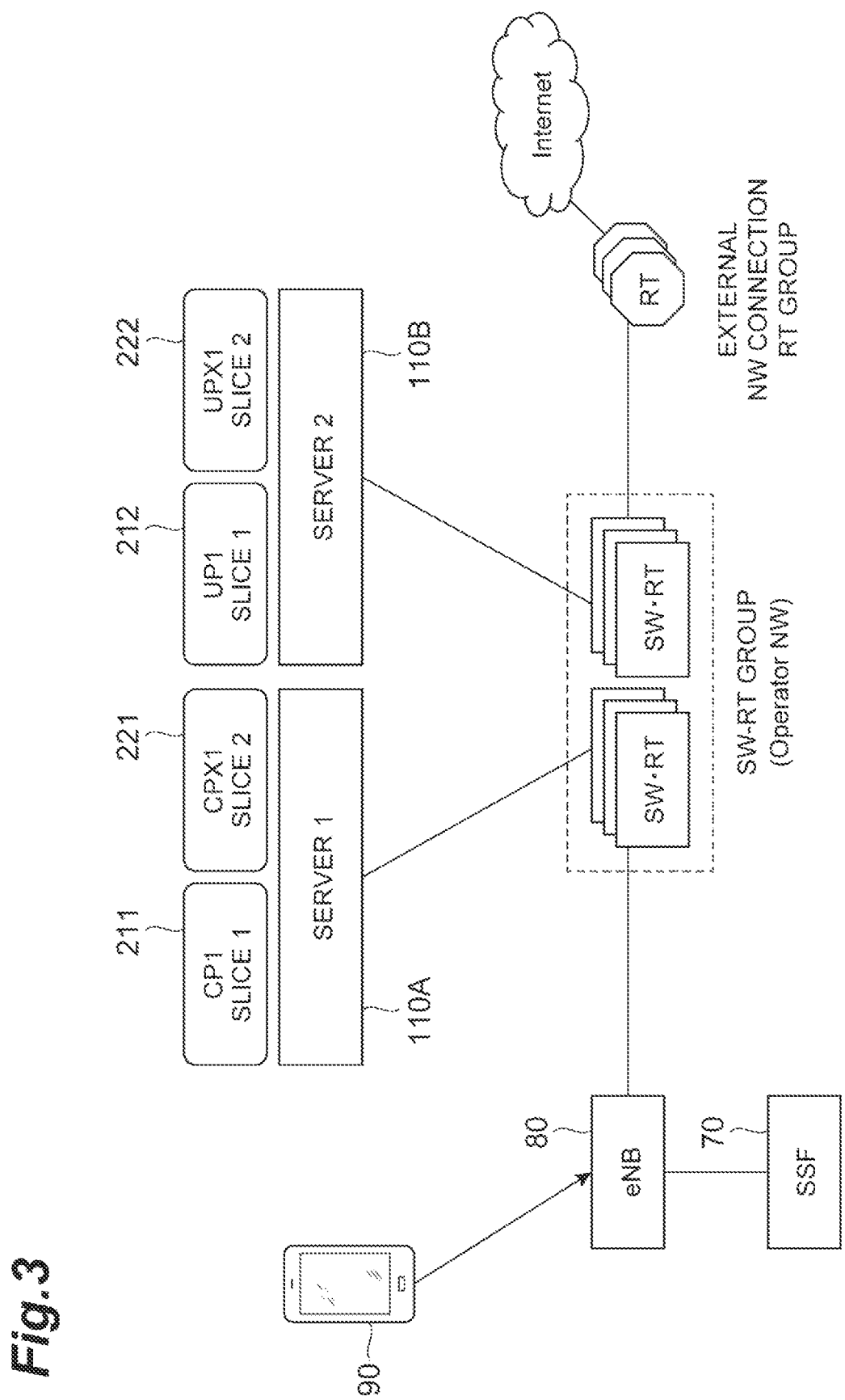
FIG. 3 is a diagram illustrating a relation between slices and hardware.

FIG. 3 illustrates an example of a correspondence relation between slices and servers. As illustrated in FIG. 3, a node is a part of a server, the function of the first C-Plane control node 211 of the slice 1 (the slice SL1) and the function of the second C-Plane control node 221 of the slice 2 (the slice SL2) are realized by a server 1 (110A), switches, routers, and the like. In addition, the function of the first U-Plane control node 212 of the slice 1 (the slice SL1) and the function of the second U-Plane control node 222 of the slice 2 (the slice SL2) being realized by a server 2 (110B), switches, routers, and the like. In addition, although the common C-Plane control node 301 of the slice 3 is not illustrated in FIG. 3, similar to the other nodes described above, the common C-Plane control node 301 is realized by a server, switches, routers, and the like.

After the NFVO 30 assigns a network service to a slice, the NFVO 30 transmits access information including an ID of the network service and a destination (for example, an IP address) of a logical node providing an initial function of the network service to the BSS/OSS 10.

When the address information is received, the BSS/OSS 10 notifies each SSF 70 of the address information. The SSF 70 is a server apparatus that can communicate with an eNodeB (eNB) 80 that is a base station device, and, when a service request is received by the eNB 80 together with a network service ID from the UE 90 that is a service user, the network service ID received from the UE 90 is notified to the SSF 70 from the eNB 80. In addition, the SSF 70 may be realized integrally with the eNB 80 or may be realized integrally with any other device such as a mobility management entity (MME).

When a network service ID is received from the eNB 80, the SSF 70 transmits destination information of a logical node providing an initial function of a network service of address information corresponding to the network service ID received from the eNB 80 in the address information stored by the SSF 70 to the eNB 80. The eNB 80 notifies the UE 90 of the destination information. In this way, the UE 90 can identify a destination to be initially accessed for using the network service.

As described above, the SSF 70 stores information of a logical node that provides a function of a network service. In other words, the SSF 70 stores information used for identifying a service that is compatible for each logical node. While details will be described later, the SSF 70 has a function of providing the information on the basis of an inquiry from another logical node.

Here, a technical task in a core network N1 configured by each node of a slice created by the system 1 according to this embodiment and other devices will be described with reference to FIGS. 2 and 4. This core network N1 represents a core network when the UE 90 uses a service by performing communication.

As illustrated in FIG. 2, in the core network N1 including slices built into the system 1, the UE 90 communicates with the service server 101 through the eNB 80 and the first U-Plane control node 212 relating to the service S1 arranged in the slice SL1 and accordingly, can use the service S1 provided by the service server 101. At this time, a communication path used for transmitting and receiving user data relating to the UE 90 is arranged between the eNB 80 and the first U-Plane control node 212. In other words, the first U-Plane control node 212 functions as a control node in the slice SL1. In addition, control signals used for performing processes relating to establishment and disconnection of a communication path between the eNB 80 and the first U-Plane control node 212 are transmitted and received through the common C-Plane control node 301 and the first C-Plane control node 211.

In addition, the UE 90 communicates with the service server 102 through the eNB 80 and the second U-Plane control node 222 relating to the service S2 arranged in the slice SL2 and accordingly, can use the service S2 provided by the service server 102. At this time, a communication path used for transmitting and receiving user data relating to the UE 90 is arranged between the eNB 80 and the second U-Plane control node 222. In other words, the second U-Plane control node 222 functions as a control node in the slice SL2. In addition, control signals used for performing processes relating to establishment and disconnection of a communication path between the eNB 80 and the second U-Plane control node 222 are transmitted and received through the common C-Plane control node 301 and the second C-Plane control node 221.

In this way, in this embodiment, by arranging communication paths between the eNB 80 in an area in which the UE 90 is present and two slices SL1 and SL2, the UE 90 is brought into a state in which communication can be executed using the slices SL1 and SL2.

Figure 4:
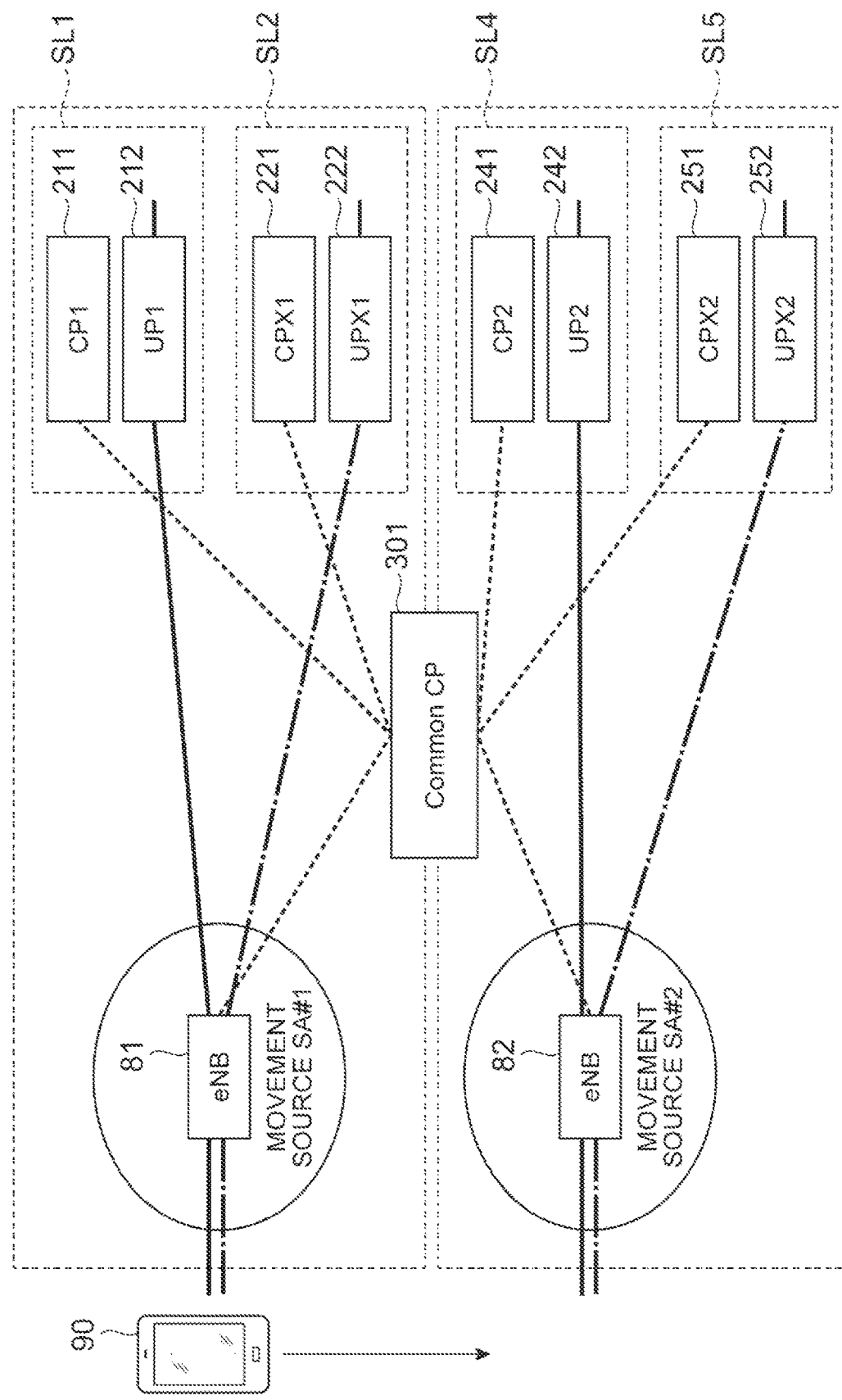
FIG. 4 is a diagram illustrating a technical task in an embodiment of the present invention.

Here, as illustrated in FIG. 4, in accordance with a certain situation, it is assumed that the UE 90 needs to change a slice performing communication for using a service or needs to change a communication path between the slice and the UE 90. While there are several possibilities for the UE 90 to perform the change described above, there is a possibility that a communication path or a slice of another party in which the communication path is disposed may need to be changed in accordance with a change in context information relating to the UE 90 (for example, a change in the base station or a sector to which it belongs, a change in the movement speed according to riding on a vehicle or the like, entering a building, congestion information of the surroundings, or the like). For example, when the UE 90 changes an accessing eNB in accordance with movement of the UE 90 over a communication area, in other words, a change in position information, there is a need to change the communication path arranged between the eNB before movement and a slice. In addition, in a case in which the UE 90 is using a plurality of services, there are cases in which the UE 90 may dispose communication paths with the control nodes in a plurality of slices via an eNB, and with change in the context information pertaining to the UE 90, it is also conceivable to combine this into a single slice. Also in such a case, there are cases in which it may be necessary to provide a communication path again.

FIG. 4 illustrates an example of a case in which the UE 90 moves over a service providing area. In the example illustrated in FIG. 4, two areas are illustrated. An area (service area (SA)) #1 is an area controlled by an eNB 81, and an area (SA) #2 is an area controlled by an eNB 82. In the SA #1, the UE 90 can use services S and S2 by setting up communication paths with the slices SL1 and SL2. In addition, in the SA #2, the UE 90 can use the services S1 and S2 by setting up communication paths with the slices SL4 and SL5. FIG. 4 illustrates a case in which the UE 90 moves from SA #1 to SA #2 described above.

In the slice SL4, functions relating to a fourth C-Plane control node 341 (CP2) and a fourth U-Plane control node 342 (UP2) are arranged. It is assumed that the fourth U-Plane control node 342 can arrange a communication path to the service server 101 providing the service S. In addition, in a slice SL5, functions relating to a fifth C-Plane control node 351 (CPX2) and a fifth U-Plane control node 352 (UPX2) are arranged. It is assumed that the fifth U-Plane control node 352 can arrange a communication path with the service server 102 providing the service S2.

When the UE 90 is present in SA #1, in order for the UE 90 to receive provision of the service S1, a communication path relating to the UE 90 is set up between the eNB 81 and the first U-Plane control node 212 of the slice SL1. In addition, in order for the UE 90 to receive provision of the service S2, a communication path relating to the UE 90 is set up between the eNB 81 and the first U-Plane control node 222 of the slice SL2.

Here, when the UE 90 moves from SA #1 to SA #2, a base station device accessed by the UE 90 becomes the eNB 82. In the example illustrated in FIG. 4, in order for the UE 90 to receive provision of the service S1, a communication path needs to be set up between the eNB 82 and the fourth U-Plane control node 242 of the slice SL4. In addition, in order for the UE 90 to receive provision of the service S2, a communication path needs to be set up between the eNB 82 and the fifth U-Plane control node 252 of the slice SL5. Here, it is assumed that the common C-Plane control node 301 has a function of controlling C-Plane control nodes 211, 221, 241, and 251 of both the areas (SA #1 and SA #2), and executes a process relating to establishment and disconnection of a communication path between a user and each slice on the basis of a direction from the user side.

As illustrated in FIG. 4, in order for the UE 90 to receive the same service as that before movement also after the movement between areas, there are cases in which a target slice in which a communication path for transmitting/receiving user data is set up needs to be changed. In addition, even in a case in which services can be used by accessing the slices SL1 and SL2, since the eNB controlling communication relating to the UE 90 is changed in accordance with movement of the UE 90 inside the area, a communication path needs to be set up again.

In this embodiment, in this way, when the UE 90 communicates with a plurality of slices, a process performed in a case in which a slice with which the UE 90 communicates for using a service needs to be changed, or communication paths set up between the plurality of slices and the UE 90 need to be changed in accordance with a certain situation will be described. The process described in the following embodiment has a feature that the communication path is changed while a state in which the UE 90 uses a service continues. A state in which the UE 90 uses a service continues means that the communication path is continued to be in a connected mode. In order to realize this, for each of communication paths set up in control nodes of a plurality of slices, while a state in which a communication path before change and a communication path after change coexist is formed, a process relating to changing of the communication path is performed.

Figure 5:
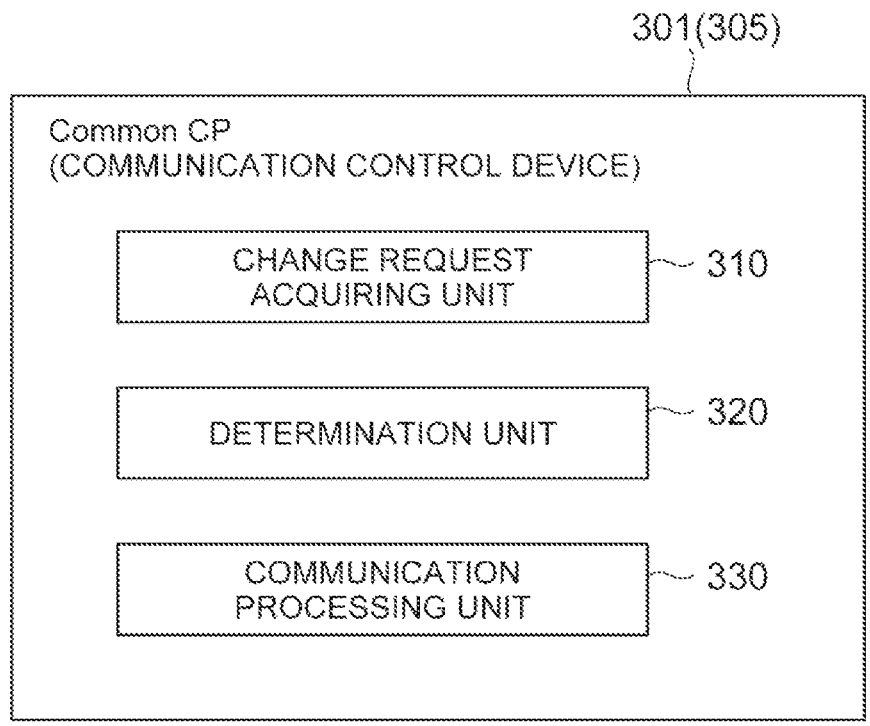
FIG. 5 is a diagram illustrating functional blocks of a communication control device.

The process described above is executed independently by the common C-Plane control node 301. In other words, the common C-Plane control node 301 functions as a communication control device controlling a communication path relating to the UE 90 disposed in control nodes of a plurality of slices. For this reason, the common C-Plane control node 301, as illustrated in FIG. 5, includes a change request acquiring unit 310, a determination unit 320, and a communication processing unit 330.

The change request acquiring unit 310 has a function for acquiring a request relating to changing of a communication path with the slice SL1 and the like. In a case in which a communication path relating to the UE 90 is changed in accordance with movement of the UE 90, a request relating to changing of the communication path is transmitted from the eNB accessed by the UE 90. In addition, in a case in which a communication path is changed in accordance with a change in other context information, there are cases in which a request relating to changing of the communication path is transmitted from a device other than the eNB. As a device other than the eNB transmitting a request relating to changing of the communication path, for example, the UE 90 or the SSF 70 having a function of collecting context information relating to the UE 90, or the like may be conceived. When a request relating to changing of the communication path is acquired by the change request acquiring unit 310, information included in the request is transmitted to the determination unit 320.

The determination unit 320 has a function for determining whether or not a communication path relating to the UE 90 that is a target for the request relating to changing of a communication path is set up in a plurality of slices. The determination unit 320 performs the determination described above on the basis of information included in the request for changing of a communication path. In addition, a process using the communication processing unit 330 is performed on the basis of a result of the determination acquired by the determination unit 320.

The communication processing unit 330 performs a process relating to changing of a communication path on the basis of the request relating to changing of a communication path such that the communication path is changed while the UE 90 is using the service. Details of the process performed by the communication processing unit 330 will be described later.

Figure 6:
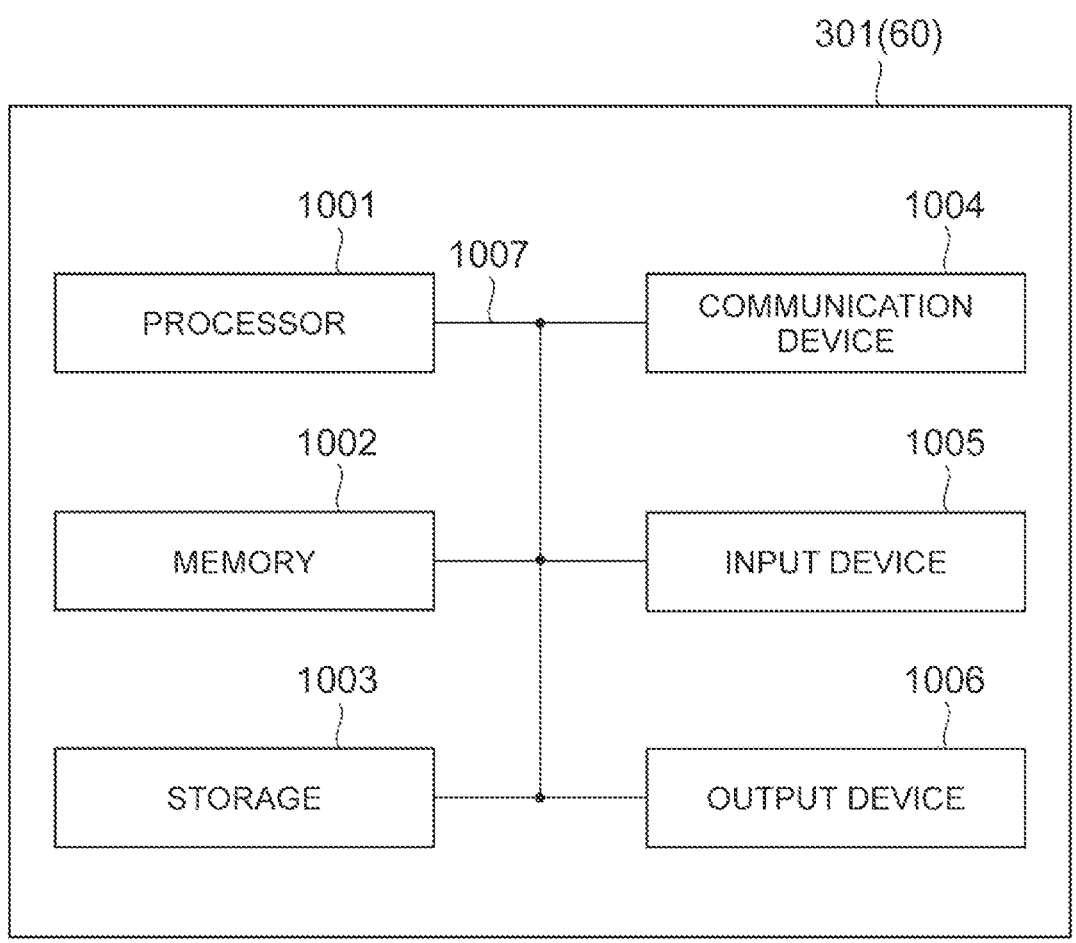
FIG. 6 is a diagram illustrating the hardware configuration of a communication control device.

FIG. 6 is a diagram illustrating one example of the hardware configuration of a server (for example, a server configuring the common C-Plane control node 301 or the like) realizing the function of each node executing a process according to this embodiment. The server described above may be physically configured as a computer apparatus including a processor 1001, a memory 1002, a storage 1003, a communication device 1004, an input device 1005, an output device 1006, a bus 1007, and the like.

In addition, in the following description, the term "a device" may be rephrased as a circuit, a device, a unit, or the like. The hardware configuration of the server described above may be configured to include one or a plurality of devices illustrated in the drawing or may be configured not to include some devices.

Each function of the server is realized by causing the processor 1001 to perform an arithmetic operation by causing predetermined software (program) to be read on hardware such as the processor 1001 and the memory 1002 and controlling communication using the communication device 1004 and data reading and/or writing for the memory 1002 and the storage 1003.

The processor 1001, for example, controls the entire computer by operating an operating system. The processor 1001 may be configured using a central processing unit (CPU) including an interface for peripheral devices, a control device, an arithmetic operation device, a register, and the like. For example, the communication processing unit 330 and the like of the common C-Plane control node 301 described above may be realized using the processor 1001.

In addition, the processor 1001 may read a program (program code), a software module, and data from the storage 1003 and/or the communication device 1004 into the memory 1002 and executes various processes in accordance therewith. As the program, a program causing a computer to execute at least some of the operations described in the embodiment described above is used. For example, the communication processing unit 330 described above may be realized by a control program that is stored in the memory 1002 and is operated by the processor 1001, and the other functional blocks may be similarly realized. While various processes described above have been described as being executed by one processor 1001, the processes may be executed by two or more processors 1001 simultaneously or sequentially. The processor 1001 may be realized using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like executable to perform a radio communication method according to one embodiment of the present invention.

The storage 1003 is a computer-readable recording medium and, for example, may be configured by at least one of an optical disc such as a compact disc ROM (CD-ROM), a hard disk drive, a flexible disk, a magneto-optical disc (for example, a compact disc, a digital versatile disc, or a Blue-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above, for example, may be a database including the memory 1002 and/or storage 1003, a server, or any other appropriate medium.

The communication device 1004 is hardware (a transmission/reception device) for performing inter-computer communication through a wired and/or wireless network and, for example, may also be called as a network device, a network controller, a network card, a communication module, or the like. For example, the change request acquiring unit 310, the communication processing unit 330, and the like described above may be realized by the communication device 1004.

The input device 1005 is an input device (for example, a keyboard, a mouse, a microphone, a switch, a button, a sensor, or the like) accepting an input from the outside. The output device 1006 is an output device (for example, a display, a speaker, an LED lamp, or the like) performing output to the outside. In addition, the input device 1005 and the output device 1006 may have an integrated configuration (for example, a touch panel).

In addition, devices such as the processor 1001, the memory 1002, and the like are interconnected through a bus 1007 for communication of information. The bus 1007 may be configured as a single bus or may be configured using buses different for devices.

In addition, the common C-Plane control node 301 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by hardware. For example, the processor 1001 may be realized using at least one of such hardware components.

Next, a specific process of changing a communication path relating to the UE 90 in the system 1 including the common C-Plane control node 301 (a communication control method) will be described. In a case in which the UE 90 changes the communication path while using a plurality of services, as described above, a process relating to changing of a communication path is performed while a state in which a communication path before change and a communication path after change coexist is formed.

As a premise, it is assumed that communication paths relating to the UE 90 are set up in two slices. In this case, relating to a method of arranging a communication path before change and a communication path after change, specifically, four cases may be conceived. There are, first, a case in which a slice in which a communication path is set up is not changed, and only the communication path is changed, second, a case in which a communication path is set up in each of two slices that are slices different from the slice before change and two services can be individually provided, third, a case in which a communication path is set up in one slice other than the slice before change, and information of slices with which the DNS server is compatible is stored, and, fourth, a case in which a communication path is set up in one slice different from the slice before change, and information of slices with which the DNS server is compatible is not stored. Hereinafter, for each of these four cases, the situation will be described, and a specific process will be described with reference to a sequence diagram.

(First Case: Case in which Only the Communication Path is Changed)

Figure 7:
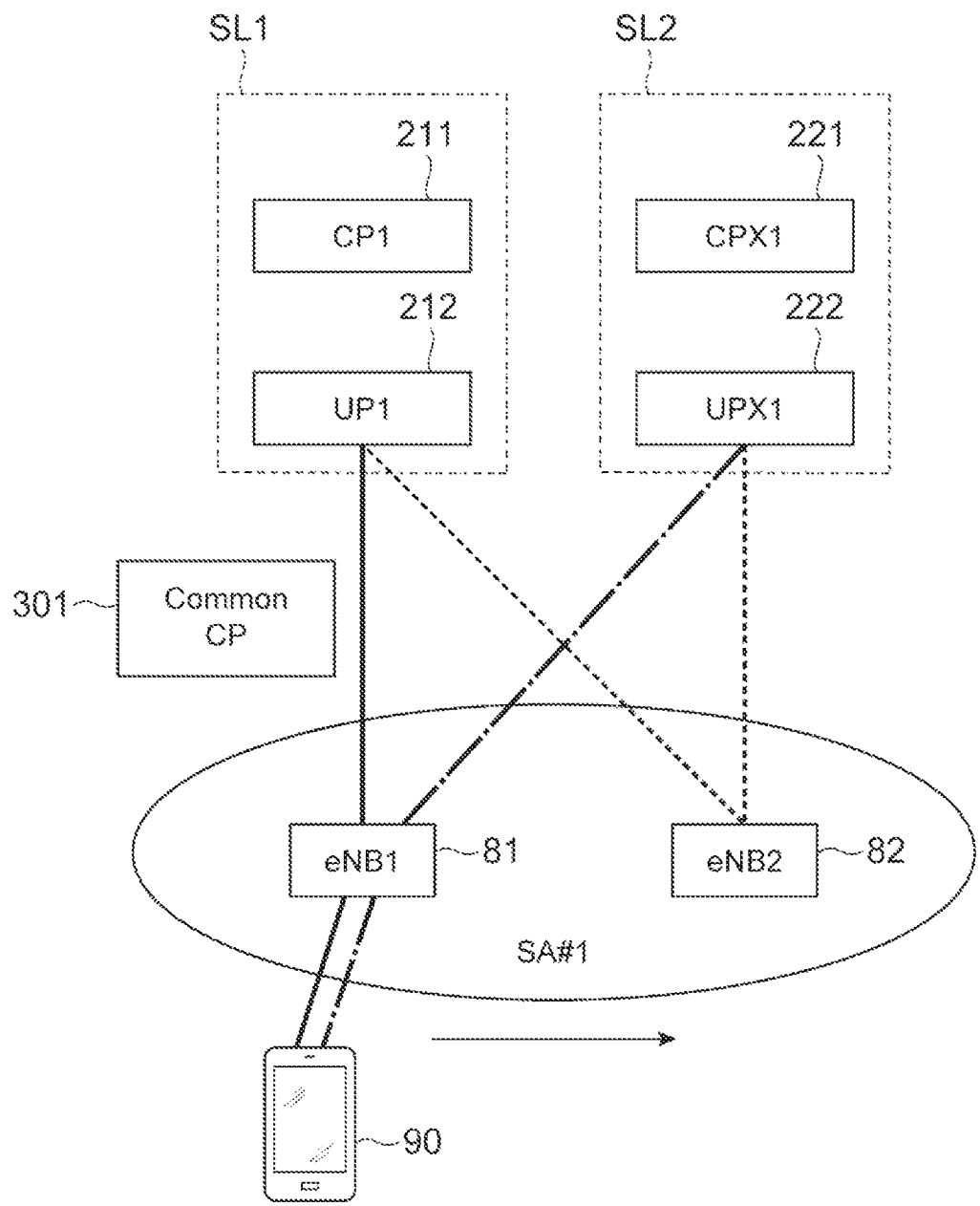
FIG. 7 is a diagram illustrating a situation relating to a first case.

FIG. 7 is a diagram illustrating a situation of the first case. The case illustrated in FIG. 7, for example, is a case in which the UE 90 moves within an area SA #1 in which the UE 90 can use services S1 and S2 by performing communication between slices SL1 and SL2. In this case, while a base station device when the UE 90 performs communication is changed from an eNB 81 to an eNB 82 through handover, the services S1 and S2 can be used by continuously communicating with the slices SL1 and SL2. Accordingly, a communication path before movement between the eNB 81 and the first U-Plane control node 212 is switched to a communication path between the eNB 82 and the first U-Plane control node 212, and a communication path before movement between the eNB 81 and the second U-Plane control node 222 is switched to a communication path between the eNB 82 and the second U-Plane control node 222, whereby the services S1 and S2 can be continuously used.

The sequence of a specific process in such a case will be described with reference to FIG. 8.

First, transmission/reception of signals relating to handover is performed between the eNB 81 of the UE 90 before movement and the eNB 82 of a movement destination (HO Request, HO Request ACK: S101). By being triggered upon this signal, a process relating to handover is performed among the UE 90, the eNB 81, and the eNB 82 (Handover Execution: S102).

Thereafter, a signal executing a request relating to changing of a communication path is transmitted from the eNB 82 of a movement destination to the common C-Plane control node 301 (Path Switch Request: S103: Change request acquiring step). In addition, here, since a case in which the UE 90 performs handover is described, a signal for executing a request relating to changing of a communication path is "Path Switch Request," and a signal for executing a request relating to changing of a communication path may be appropriately changed in accordance with a situation for changing the communication path. This similarly applies to the other cases.

In a request relating to changing of a communication path, information for identifying a UE 90, information for identifying a communication path (TU-1 and TU-2), and information for identifying a session (S-ID1 and S-ID2) are included. In addition, instead of the information for identifying a session (S-ID: Session ID), an ID of a radio access bearer (E-RAB ID: E-UTRAN Radio Access Bearer ID) may be used. This point is similar also in the other embodiments and the other cases to be described later. When the change request acquiring unit 310 of the common C-Plane control node 301 receives a request from the eNB 82, the determination unit 320 determines whether or not the UE 90 has set up communication paths with two slices on the basis of the request relating to changing of a communication path (S104: Determination step). In this embodiment, in a case in which a plurality of pieces of information for identifying communication paths and a plurality of pieces of information for identifying sessions are included in the request relating to changing of a communication path, the determination unit 320 can determine that two communication paths have been individually set up for the UE 90. In this way, the determination unit 320 determines whether or not a plurality of communication paths have been set up using the information included in the request relating to changing of a communication path. Then, in a case in which the determination unit 320 determines that a plurality of communication paths have been set up for the UE 90, the following process illustrated in FIG. 8 is performed. In addition, in a case in which the determination unit 320 determines that a plurality of communication paths have not been set up for the UE 90, in other words, for the UE 90, a communication path has been set up with only one slice, or no communication path has been set up, a process relating to known handover is performed.

In a case in which the determination unit 320 determines that a plurality of communication paths have been set up for the UE 90, the communication processing unit 330 of the common C-Plane control node 301 transmits a direction relating to changing of a communication path to the first C-Plane control node 211 and the second C-Plane control node 221 on the basis of the information for identifying a session and the like (Path Switch Request: S105 and S106: Communication processing step). In the direction relating to changing of a communication path, information for identifying an eNB 82 that is a destination to be changed to (eNB ID) and information for identifying a communication path that is to be changed (TU-1 or TU-2) are included. In addition, the order (S105 and S106) of transmissions of directions relating to changing of a communication path to two nodes may be changed.

When a direction relating to changing of a communication path is received, the first C-Plane control node 211 performs a process relating to changing of a communication path in accordance with a known sequence on the basis of the direction. More specifically, by transmitting information (eNB ID) for identifying an eNB 82 that is a change destination together with information (TU-1) for identifying a communication path that is a change target to the first U-Plane control node 212 of the same slice SL1, creation of a communication path is directed (Modify Bearer Request: S107). For this, after executing a process relating to creation of a communication path, the first U-Plane control node 212 transmits a notification indicating execution of the process of creating a communication path together with information (a UP1 ID) for identifying its own node to the first C-Plane control node 211 as a response (Modify Bearer Response: S109). The first C-Plane control node 211 that has received a response from the first U-Plane control node 212 notifies the common C-Plane control node 301 of completion of the process relating to changing of a communication path as a response to the direction (S105) relating to changing of a communication path (Path Switch Request ack: S111: Communication processing step).

A similar process is performed also for the second C-Plane control node 221. In other words, when a direction relating to changing of a communication path is received, the second C-Plane control node 221 performs a process relating to changing of a communication path in accordance with a known sequence on the basis of the direction. More specifically, by transmitting information (eNB ID) for identifying an eNB 82 that is a change destination together with information (TU-2) for identifying a communication path that is a change target to the second U-Plane control node 222 of the same slice SL2, creation of a communication path is directed (Modify Bearer Request: S108). For this, after executing a process relating to creation of a communication path, the second U-Plane control node 222 transmits an indication of execution of the process of creating a communication path together with information (UPX1 ID) for identifying its own node to the second C-Plane control node 221 as a response (Modify Bearer Response: S109). The second C-Plane control node 221 that has received a response from the first U-Plane control node 222 notifies the common C-Plane control node 301 of completion of the process relating to changing of a communication path as a response to the direction (S106) relating to changing of a communication path (Path Switch Request ack: S112: Communication processing step).

Figure 8:
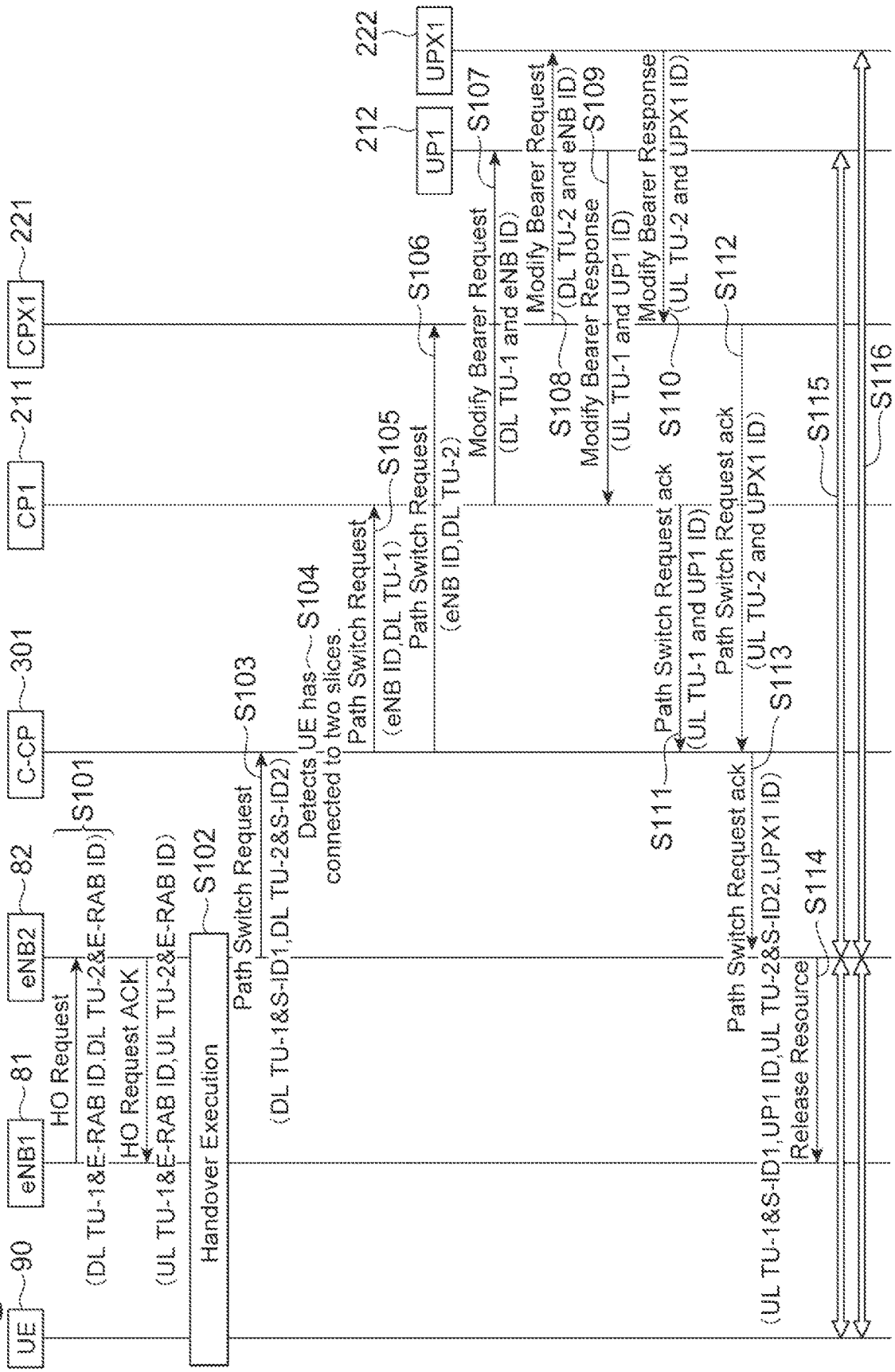
FIG. 8 is a sequence diagram illustrating a process relating to the first case.

FIG. 8 illustrates the process of the slice SL1 and the process of the slice SL2 to be alternately performed. However, since the process of the slice SL1 and the process of the slice SL2 are individually performed, the order of the processes may be different from the order illustrated in FIG. 8.

When a response (S111) from the first C-Plane control node 211 and a response (S112) from the second C-Plane control node 221 are received, the common C-Plane control node 301 notifies the eNB 82 of completion of the process relating to changing of a communication path (Path Switch Request ack: S113: Communication processing step). In this signal, information (a UP1 ID) for identifying the first U-Plane control node 212 and information (a UPX1 ID) for identifying the second U-Plane control node 222 are included. The eNB 82 can identify a node that is the other party of the communication path on the basis of this information.

Thereafter, release of resources relating to the communication path is directed from the eNB 82 to the eNB 81 (Release Resource: S114). In this way, the UE 90 can transmit/receive user data to/from the first U-Plane control node 212 through the eNB 82 (S115) and can transmit/receive user data to/from the second U-Plane control node 222 through the eNB 82 (S116). In this way, the UE 90 can use the services S1 and S2 through the eNB 82.

In the process described above, at a time point at which communication paths between the eNB 82 and the first U-Plane control node 212 and the second U-Plane control node 222 are set up (S113), resources relating to the communication paths are not released on the eNB 81 side. Accordingly, after a state in which the communication paths before change and the communication paths after change coexist are formed, a process relating to changing of a communication path is performed.

In other words, after the process of setting up communication paths after change is performed, the process relating to release of the communication paths before change is performed. In this way, a state in which the communication paths before change and the communication paths after change coexist is formed.

(Second Case: Case in which Communication Paths are Newly Set Up in Two Slices)

Figure 9:
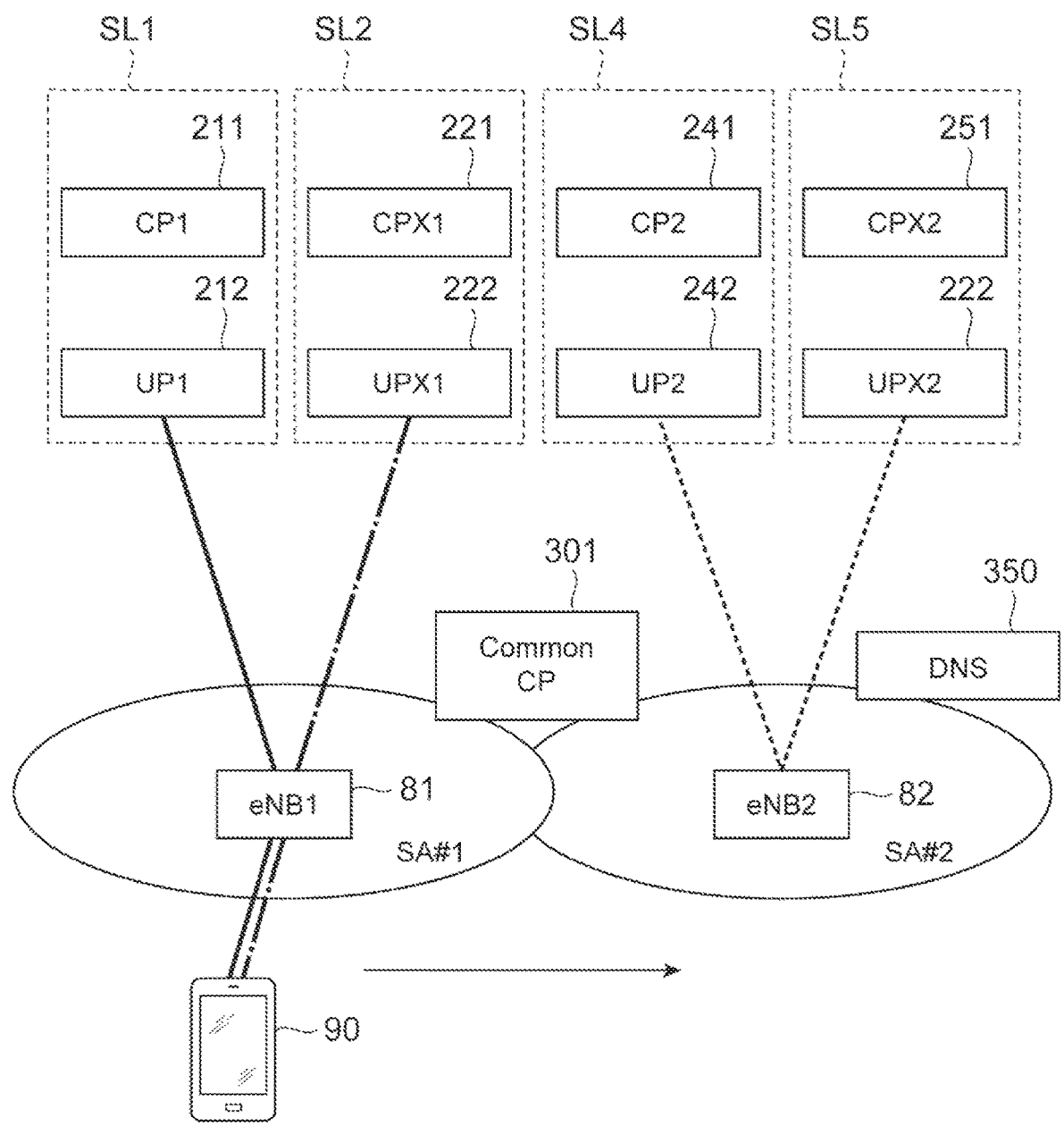
FIG. 9 is a diagram illustrating a situation relating to a second case.

FIG. 9 is a diagram illustrating a situation of the second case. The case illustrated in FIG. 9 is, for example, is a case in which the UE 90 moves from an area SA #1 in which the UE 90 can use services S1 and S2 by communicating with slices SL1 and SL2 to another area SA #2. In this case, not only is a base station device when the UE 90 communicates changed from the eNB 81 to the eNB 82 through handover, but slices with which the UE 90 communicates for using the services S1 and S2 need to be changed from the slices SL1 and SL2 to the slices SL4 and SL5. A communication path between the eNB 81 before movement and the first U-Plane control node 212 is switched to a communication path between the eNB 82 and the fourth U-Plane control node 242. In addition, a communication path between the eNB 81 before movement and the second U-Plane control node 222 is switched to a communication path between the eNB 82 and the fifth U-Plane control node 252. In this way, the UE 90 can continuously use the services S1 and S2. In addition, a slice with which a communication path needs to be set up by the eNB 82 in the area SA #2 of a movement destination of the UE 90 for enabling the UE 90 to use the services S1 and S2 is not known to the eNB 82, the common C-Plane control node 301, the UE 90, and the like. This information is acquired by the common C-Plane control node 301 by inquiring a domain name system (DNS) server 350 thereof. The DNS server 350 stores information relating to mapping between a domain name and an IP address and also stores information relating to slices.

The order of a specific process in such a case will be described with reference to FIG. 10.

First, transmission/reception of signals relating to handover are performed between the eNB 81 of the UE 90 before movement and the eNB 82 of a movement destination (HO Request, HO Request ACK: S201). By being triggered upon these signals, a process relating to handover is performed among the UE 90, the eNB 81, and the eNB 82 (Handover Execution: S202).

Thereafter, a signal for performing a request relating to changing of a communication path is transmitted from the eNB 82 of the moving destination to the common C-Plane control node 301 (Path Switch Request: S203: Change request acquiring step).

In the request relating to changing of a communication path, information for identifying a UE 90, information for identifying communication paths (TU-1 and TU-2), and information for identifying sessions (S-ID1 and S-ID2) are included. When a request from the eNB 82 is received by the change request acquiring unit 310 of the common C-Plane control node 301, the determination unit 320 determines whether or not the UE 90 sets up communication paths with two slices on the basis of the information included in the request relating to changing of a communication path (S204: Determination step). In this embodiment, in a case in which a plurality of pieces of information for identifying communication paths are included, and a plurality of pieces of information for identifying sessions are included in the request relating to changing of a communication path, the determination unit 320 can determine that two communication paths are individually set up for the UE 90. In this way, the determination unit 320 determines whether or not a plurality of communication paths are set up on the basis of information included in the request relating to changing of a communication path. Then, in a case in which the determination unit 320 determines that a plurality of communication paths are set up for the UE 90, the following process illustrated in FIG. 10 is performed. On the other hand, in a case in which the determination unit 320 determines that a plurality of communication paths are not set up for the UE 90, in other words, a communication path is set up with only one slice for the UE 90, or no communication path is set up, a process relating to known handover is performed.

In addition, the determination unit 320 checks that two slices SL1 and SL2 do not cover an area controlled by the eNB 82 (S204). The common C-Plane control node 301 acquires information relating to the slice SL1 in which the first C-Plane control node 211 is included and the slice SL2 in which the second C-Plane control node 221 is included when communication paths between the eNB 81 and the slices SL1 and SL2 are established. Accordingly, the common C-Plane control node 301 can perceive that two slices SL1 and SL2 do not cover an area controlled by the eNB 82.

In a case in which the determination unit 320 checks that a plurality of communication paths are set up for the UE 90, and the slices SL1 and SL2 do not cover the area controlled by the eNB 82, the communication processing unit 330 of the common C-Plane control node 301 inquires the DNS server 350 of information relating to a slice when a communication path is set up through the eNB 82 (DNS Query Request/Response: S205: Communication processing step). More specifically, information for identifying a C-Plane control node that can perform communication when the services S1 and S2 are used through the eNB 82 is acquired. As a result, the communication processing unit 330 identifies a C-Plane control node 241 of a slice (here, the slice SL4) to be accessed for using the service S1 and a C-Plane control node 251 of a slice (here, the slice SL5) to be accessed for using the service S2 on the basis of an access point name (APN) of a service server transmitting/receiving user data to/from the eNB 82 and the position of the UE 90 (in other words, information of the eNB 82 to be accessed) from information relating to the C-Plane control node acquired from the DNS server 350 (S206: Communication processing step).

The communication processing unit 330 transmits a request for creating a new session relating to the UE 90 to the two C-Plane control nodes that have been identified, in other words, the fourth C-Plane control node 241 and the fifth C-Plane control node 251 (Create Session Request: S207 and S208: Communication processing step). In the request for creating a session, information (an eNB ID) for identifying an eNB 82 of an access destination and information (TU-1 or TU-2) for identifying a communication path set up in accordance with creation of a session are included. In addition, the order of transmissions of the requests for creating a session (S207 and S208) to the two nodes may be changed.

When a request for creating a session is received, the fourth C-Plane control node 241 performs a process relating to creating a communication path in accordance with a known sequence on the basis of the request. More specifically, the fourth U-Plane control node 242 of the same slice SL4 is selected as a U-Plane control node creating a communication path (UP Selection: S209). Thereafter, by transmitting information (an eNB ID) for identifying the eNB 82 together with information (TU-1) for identifying a communication path to the fourth U-Plane control node 242, creation of a communication path is directed (Create Session Request: S211). After executing the process relating to creating a communication path, the fourth U-Plane control node 242 transmits an indication of execution of the process of creating a communication path to the fourth C-Plane control node 241 together with information (a UP2 ID) for identifying its own node as a response (Create Session Response: S213). The fourth C-Plane control node 241 that has received the response from the fourth U-Plane control node 242 notifies the common C-Plane control node 301 of completion of the process relating to creating a communication path as a response to the request for creating a session (S207) (Create Session Response: S215: Communication processing step).

A similar process is performed also for the fifth C-Plane control node 251. In other words, when a request for creating a session is received, the fifth C-Plane control node 251 performs a process relating to creating a communication path in accordance with a known sequence on the basis of the request. More specifically, the fifth U-Plane control node 252 of the same slice SL5 is selected as a U-Plane control node creating a communication path (UP Selection: S210). Thereafter, by transmitting information (an eNB ID) for identifying the eNB 82 together with information (TU-2) for identifying a communication path to the fifth U-Plane control node 252, creation of a communication path is directed (Create Session Request: S212). After executing the process relating to creating a communication path, the fifth U-Plane control node 252 transmits an indication of execution of the process of creating a communication path to the fifth C-Plane control node 251 together with information (a UP2 ID) for identifying its own node as a response (Create Session Response: S214). The fifth C-Plane control node 251 that has received the response from the fifth U-Plane control node 252 notifies the common C-Plane control node 301 of completion of the process relating to creating a communication path as a response to the request for creating a session (S208) (Create Session Response: S216: Communication processing step).

Figure 10:
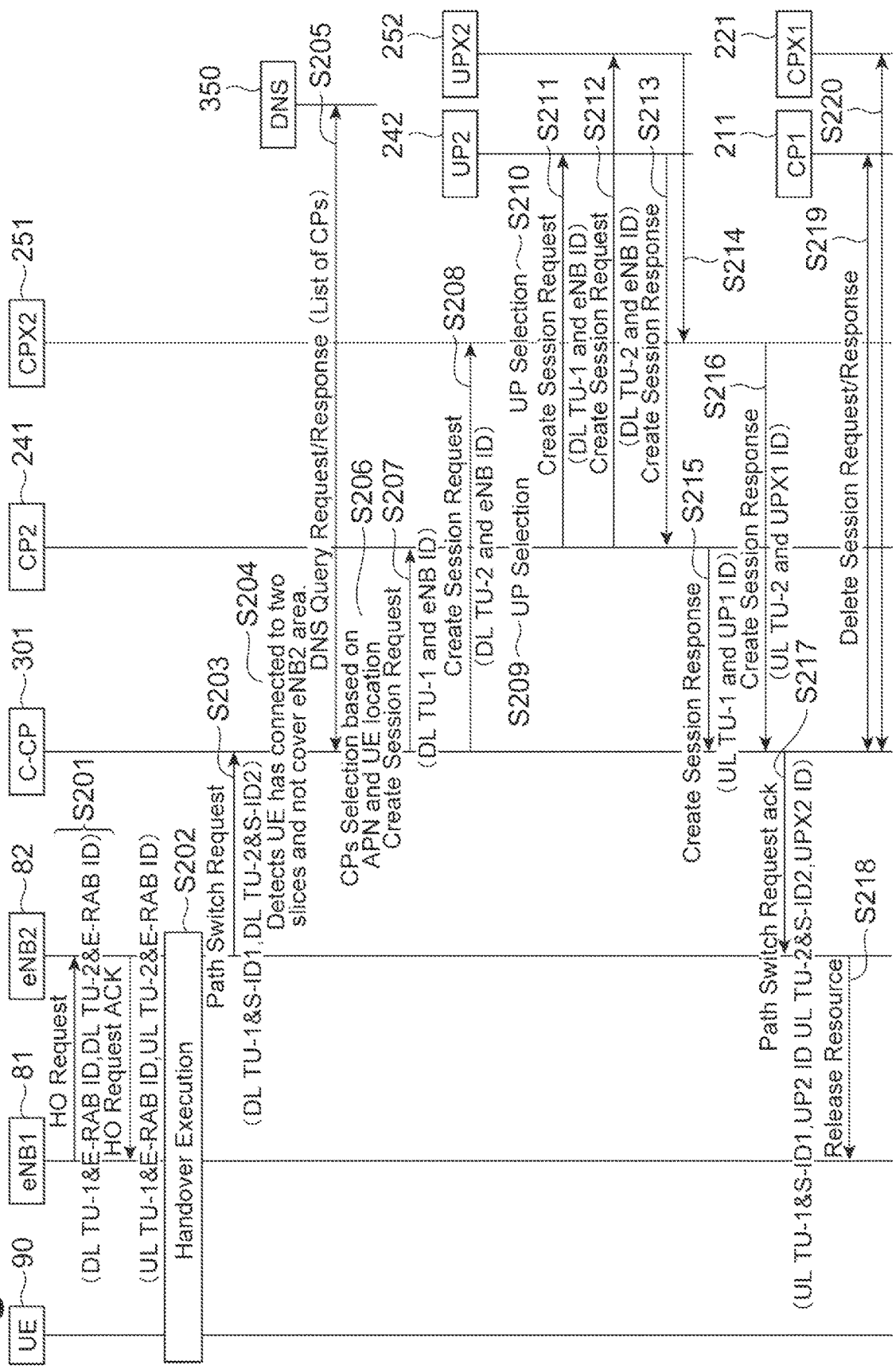
FIG. 10 is a sequence diagram illustrating a process relating to the second case.

FIG. 10 illustrates the process of the slice SL4 and the process of the slice SL5 to be alternately performed. However, since the process of the slice SL4 and the process of the slice SL5 are individually performed, the order of the processes may be different from the order illustrated in FIG. 10.

When a response (S215) from the fourth C-Plane control node 241 and a response (S216) from the fifth C-Plane control node 251 are received, the common C-Plane control node 301 notifies the eNB 82 of completion of the process relating to changing of a communication path (Path Switch Request ack: S217: Communication processing step). In these signals, information (a UP2 ID) for identifying the fourth U-Plane control node 242 and information (a UPX2 ID) for identifying the fifth U-Plane control node 252 are included. The eNB 82 can identify a node that is the other party of the communication path on the basis of this information.

Thereafter, release of resources relating to the communication path is directed from the eNB 82 to the eNB 81 (Release Resource: S218). In addition, the common C-Plane control node 301 directs the first C-Plane control node 211 of the slice SL1 and the second C-Plane control node 221 of the slice SL2 having communication paths set with the eNB 81 to release sessions and performs a session release process (Delete Session Request/Response: S219, S220: Communication processing step). The order of the resource release direction (S218) from the eNB 82 to the eNB 81 and the session release direction (S219 and S220) from the common C-Plane control node 301 may be changed.

According to the process described above, the UE 90 can transmit/receive user data to/from the fourth U-Plane control node 242 through the eNB 82 and can transmit/receive user data to/from the fifth U-Plane control node 252 through the eNB 82. In this way, the UE 90 can use the services S1 and S2 through the eNB 82.

In the process described above, resources relating to two communication paths are not released on the eNB 81 side at a time point (S217) at which communication paths between the eNB 82 and the fourth U-Plane control node 242 and the fifth U-Plane control node 252 are set up. Accordingly, after a state in which communication paths before change and communication paths after change coexist is formed, the process relating to changing of communication paths is performed.

In other words, after the process of setting up communication paths after change is performed, the process relating to release of communication paths before change is performed. In this way, a state in which the communication paths before change and the communication paths after change coexist is formed.

(Third Case: Case in which Communication Path is Set Up with One Slice, and Information can be Acquired from DNS Server)

Figure 11:
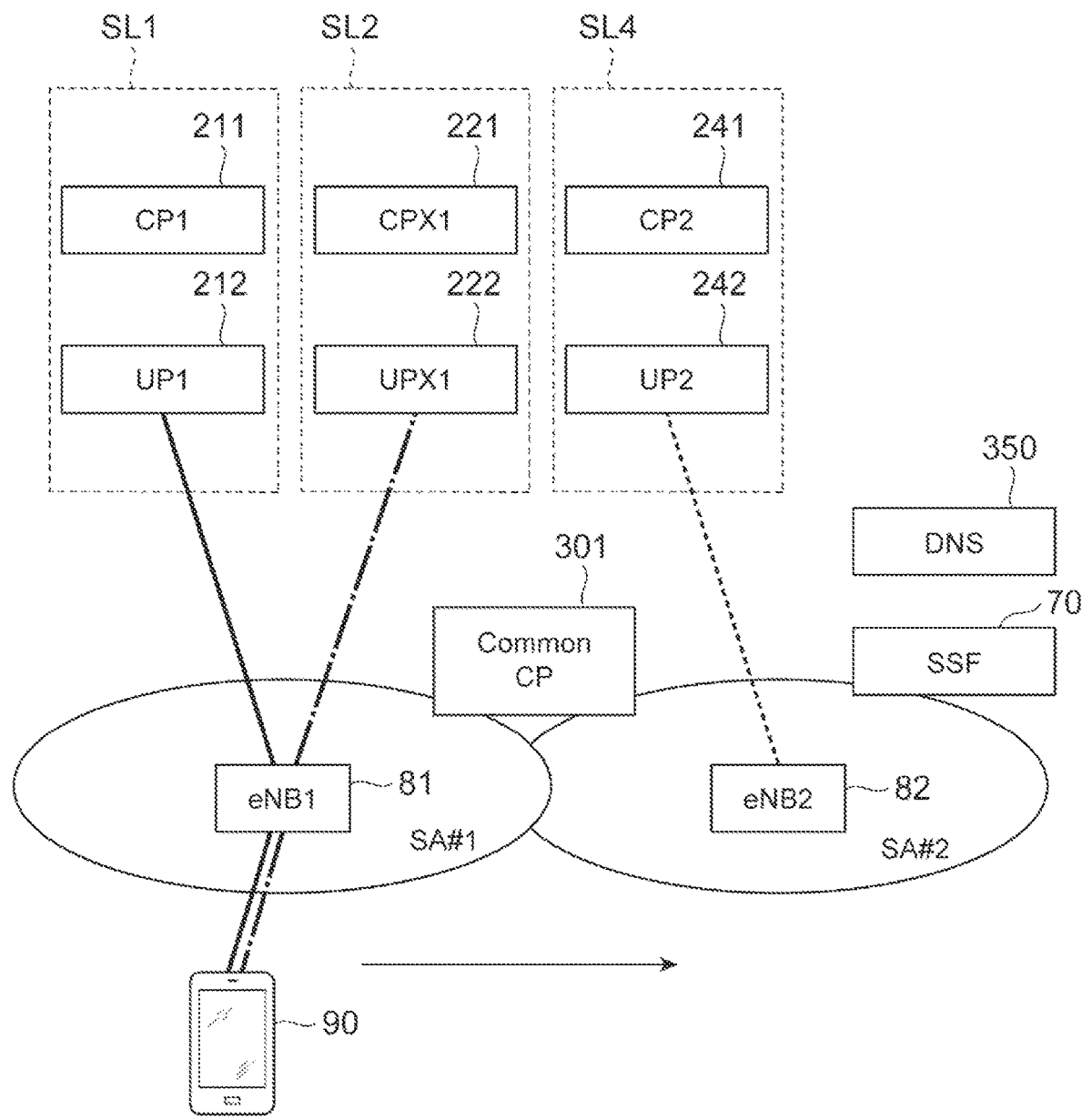
FIG. 11 is a diagram illustrating a situation relating to a third case.

FIG. 11 is a diagram illustrating a situation of the third case. The case illustrated in FIG. 11 is, for example, a case in which the UE 90 moves from an area SA #1 in which the UE 90 can use services S1 and S2 by communicating with slices SL1 and SL2 to another area SA #2. In this case, not only a base station device when the UE 90 performs communication is changed from the eNB 81 to the eNB 82 through handover, but slices with which the UE 90 communicates for using the services S1 and S2 need to be changed. Here, there are cases in which a slice SL4 corresponding to the slice SL1 is present in the area SA #2 of a moving destination, a slice corresponding to the slice SL2 is not present. In such cases, as a method for continuously using two services, in the third case, functions of both a communication path between the eNB 81 before movement and the first U-Plane control node 212 and a communication path between the eNB 81 before movement and the second U-Plane control node 222 are switched to a communication path between the eNB 82 and the fourth U-Plane control node 242. In other words, transmission/reception of user data of the two services are performed using one communication path set up in one slice SL4. In this way, the UE 90 can continuously use the services S and S2.

In addition, a slice with which a communication path needs to be set up by the eNB 82 in the area SA #2 of a movement destination of the UE 90 for enabling the UE 90 to use the services S1 and S2 is not known to the eNB 82, the common C-Plane control node 301, the UE 90, and the like. This information is acquired by the common C-Plane control node 301 by inquiring a domain name system (DNS) server 350 thereof. In addition, there are also cases in which the common C-Plane control node 301 acquires such information by inquiring the DNS server 350 and the SSF 70 thereof. Such techniques will be described later.

The sequence of a specific process in the third case as described above will be described with reference to FIG. 12.

First, transmission/reception of signals relating to handover is performed between the eNB 81 of the UE 90 before movement and the eNB 82 of a movement destination (HO Request, HO Request ACK: S301). By being triggered upon this signal, a process relating to handover is performed among the UE 90, the eNB 81, and the eNB 82 (Handover Execution: S302).

Thereafter, a signal executing a request relating to changing of a communication path is transmitted from the eNB 82 of a movement destination to the common C-Plane control node 301 (Path Switch Request: S303: change request acquiring step).

In a request relating to changing of a communication path, information for identifying a UE 90, information for identifying a communication path (TU-1 and TU-2), and information for identifying a session (S-ID1 and S-ID2) are included. When the change request acquiring unit 310 of the common C-Plane control node 301 receives a request from the eNB 82, the determination unit 320 determines whether or not the UE 90 has set up communication paths with two slices on the basis of the information included in the request relating to changing of communication paths (S304: Determination step). In this embodiment, in a case in which a plurality of pieces of information for identifying communication paths and a plurality of pieces of information for identifying sessions are included in the request relating to changing of a communication path, the determination unit 320 can determine that two communication paths are individually set up for the UE 90. In this way, the determination unit 320 determines whether or not a plurality of communication paths are set up using the information included in the request relating to changing of a communication path. Then, in a case in which the determination unit 320 determines that a plurality of communication paths are set up for the UE 90, the following process illustrated in FIG. 12 is performed. In addition, in a case in which the determination unit 320 determines that a plurality of communication paths have not been set up for the UE 90, in other words, for the UE 90, a communication path has been set up with only one slice, or no communication path has been set up, a process relating to known handover is performed.

In addition, the determination unit 320 checks that two slices SL1 and SL2 do not cover an area controlled by the eNB 82 (S304). This point is similar to the second case.

In a case in which the determination unit 320 checks that a plurality of communication paths are set up for the UE 90, and the slices SL1 and SL2 do not cover the area SA #2, the communication processing unit 330 of the common C-Plane control node 301 inquires the DNS server 350 of information relating to a slice when a communication path is set up through the eNB 82 (DNS Query Request: S305: Communication processing step). More specifically, the communication processing unit 330 transmits E-URAN cell global IDs (ECGI) or APNs (APN1&2) of service servers providing the services S1 and S2 to the DNS server 350 and acquires information for identifying C-Plane control nodes of slices with which communication is to be performed when the services S1 and S2 are used. The ECGI is information for identifying a cell in which the UE 90 is present, in other words, is information representing the position of the UE 90.

Here, in a case in which the DNS server 350 stores information illustrated in FIG. 13(A), the DNS server 350 can provide information relating to slices corresponding to various services in accordance with the position of the UE 90. In FIG. 13(A), for each area (location), a service type (Service type), and a slice used when the service is used, and a node configuring the slice are illustrated. For example, it is illustrated that, in an area identified using Location #1, a communication path with a slice 1 is set up for using a service MBB, and a communication path is set up with a slice 2 for using a service V2X. On the other hand, in an area identified using Location #2, a slice 3 is associated with both the services MBB and V2X. In addition, in an area identified using Location #3, a slice 4 is associated with both the services MBB and V2X.

The second case is a case in which, like Location #1, a difference slice is associated with each service. In contrast to this, the third case is a case in which, like Location #2 or Location #3, a node of one slice is applied to two services S1 and S2. In a case in which an area (an area in which the UE 90 is present) controlled by the eNB 82 is in such a situation, only information for identifying one C-Plane control node is returned in a result transmitted from the DNS server 350 (DNS Query Response: S306: Communication processing step). Here, information for identifying the fourth C-Plane control node 241 is transmitted from the DNS server 350 to the common C-Plane control node 301. Accordingly, the common C-Plane control node 301 determines that a session relating to the two services is arranged for a slice SL4 in which the fourth C-Plane control node 241 is included (Selects CP2 for both APN1&2 Sessions: S309: Communication processing step).

In addition, in the information stored by the DNS server 350, there are cases in which slices corresponding to the services S1 and S2 cannot be identified in an area in which the UE 90 is present. As such a case, for example, there is a case in which only information that corresponds to FIG. 13(B) is stored in the DNS server 350. In the example illustrated in FIG. 13(B), for each area (location), a slice that can be used and only a node configuring the slice are illustrated. In other words, in the case, it is not clear which service can be used by communicating with a certain slice. In such a case, for example, in a case in which the UE 90 is present in location #2, information for identifying the fourth C-Plane control node 241 of the slice SL4 is transmitted to the common C-Plane control node 301 from the DNS server 350. However, in this case, it is not clear whether or not two services can be used by communicating with the slice SL4 in which the fourth C-Plane control node 241 is included only on the basis of information from the DNS server 350. Accordingly, the communication processing unit 330 of the common C-Plane control node 301 makes an inquiry by transmitting the information for identifying the UE 90, information (APN1 & APN2) for identifying a service desired to be used, and the ECGI to the SSF 70 (Policy Request: S307: Communication processing step).

In a case in which the DNS server 350 stores only information as illustrated in FIG. 13(B), the SSF 70 may store information as illustrated in FIG. 13(C), in other words, information for identifying a slice for which communication is executed with priority for each service. In the example illustrated in FIG. 13(C), for each of two services, slices that can be associated are written in order of highest to lowest priority. The SSF 70 provides information of a corresponding slice in accordance with information for identifying a service transmitted from the common C-Plane control node 301 (Policy Response: S308: Communication processing step). Here, as information for identifying the slice SL4, information for identifying the fourth C-Plane control node 241 is provided.

Then, the common C-Plane control node 301 determines arrangement of sessions relating to two services with the slice SL4 in which the fourth C-Plane control node 241 is included on the basis of the information from the DNS server 350 and the information from the SSF 70 (Selects CP2 for both APN1&2 Sessions: S309: Communication processing step).

In this way, in a case in which an appropriate slice (the C-Plane control node) cannot be selected only using the information stored by the DNS server 350, the common C-Plane control node 301 inquires the SSF 70 as a configuration in which information for identifying a slice corresponding to a service is stored by the SSF 70, and accordingly, an appropriate slice (the C-Plane control node) for using the two services may be configured to be identified.

In addition, in the description presented above, although a case in which the DNS server 350 stores only the information as illustrated in FIG. 13(B) has been described, additionally, there are cases in which slices corresponding to the services S1 and S2 in an area in which the UE 90 is present cannot be identified using the information stored by the DNS server 350. Such a case is, for example, a case in which the DNS server 350 stores only a service type (Service type) and a correspondence between a slice used when a service is used and a node configuring the slice. In such a case, it is considered that the DNS server 350 cannot select an appropriate slice in consideration of information relating to an area in which the UE 90 is present, and it is necessary to make an inquiry for the SSF 70.

In addition, as described above, in a case in which the DNS server 350 stores a service type (Service type) and a correspondence between a slice used when a service is used and a node configuring the slice, there are cases in which a slice with which a specific service is compatible cannot be identified using only the information stored by the DNS server 350. For example, in the example illustrated in FIG. 13(A), it is represented the a slice 3 is compatible with a service MBB and a service V2X in Location #2, there are cases in which a slice that is compatible with the service V2X is not identified. Also in such cases, the DNS server 350 returns only information for identifying one C-Plane control node to the common C-Plane control node 301 as a result (DNS Query Response: S306: Communication processing step). In this way, in a case in which information for identifying one C-Plane control node is returned, there are a case in which the information of the C-Plane control node is information of a node relating to slices determined to be able to be compatible with all the plurality of services in the DNS server 350 and there is a case in which the information is information of a node relating to slices that are compatible only to a specific service. Although an inquiry may not be made for the SSF 70 in the former case, in the latter case, it is necessary to make an inquiry for the SSF 70 for continuing to use a plurality of services.

Kinds of information stored by the DNS server 350 and the SSF 70 and information to be returned in response to a request from the common C-Plane control node 301 are set in advance. For example, in a case in which the DNS server 350 performs determination based on information such as the position of the UE 90, a service used by the UE 90, and the policy of a slice, and the like, even in a case in which information relating to one C-Plane control node (information relating to a slice) is provided from the DNS server 350, it is assumed unnecessary to make an inquiry for the SSF 70. On the other hand, in a case in which information stored by the DNS server 350 is insufficient, in a case in which information relating to one C-Plane control node (information relating to a slice) is provided from the DNS server 350, it is assumed to be preferable to make an inquiry for the SSF 70. In this way, whether it is preferable to make an inquiry for the SSF 70 changes in accordance with the amount, the accuracy, and the like of information stored by the DNS server 350. Accordingly, in a case in which the common C-Plane control node 301 acquires information relating to one C-Plane control node from the DNS server 350, whether or not an inquiry is made also for the SSF 70 may be determined in advance on the basis of kinds of information stored by the DNS server 350 or may be configured to be changed in accordance with details of a response from the DNS server 350.

In addition, in a case in which the DNS server 350 and the SSF 70 cannot provide information for identifying an appropriate slice for information (APN1 & APN2) for identifying services desired to be used, the services cannot be provided, and accordingly, the provision of the service stops.

The communication processing unit 330 transmits a request for arranging a new session relating to the UE 90 to the C-Plane control node identified in the process described until now, in other words, the fourth C-Plane control node 241 (Create Session Request: S310: Communication processing step). In the request for creating a session, information (an eNB ID) for identifying an eNB 82 that is an access destination, information (TU-1 and TU-2) for identifying a communication path set up in accordance with creation of a session, and information (APN1 and APN2) for identifying a service are included. In this way, also in the fourth C-Plane control node 241, establishment of sessions relating to two services is recognized.

When a session creation request is received, the fourth C-Plane control node 241 performs a process relating to creation of a communication path in accordance with a known sequence on the basis of the request. More specifically, as a U-Plane control node creating a communication path, the fourth U-Plane control node 242 of the same slice SL4 is selected (UP Selection: S311). Thereafter, the fourth C-Plane control node 241 transmits information (an eNB ID) for identifying an eNB 82 to the fourth U-Plane control node 242 together with information (TU-1 and TU-2) for identifying communication paths, thereby directing to create communication paths (Create Session Request: S312). After performing a process relating to creation of communication paths, the fourth U-Plane control node 242 transmits a notification indicating execution of the process of creating communication paths to the fourth C-Plane control node 241 together with the information (TU-1 and TU-2) for identifying communication paths and information (a UP2 ID) for identifying its own node as a response (Create Session Response: S313). The fourth C-Plane control node 241 that has received a response from the fourth U-Plane control node 242 notifies the common C-Plane control node 301 of completion of the process relating to the creation of communication paths as a response to the session creation request (S310) (Create Session Response: S314: Communication processing step).

When the response (S314) from the fourth C-Plane control node 241 is received, the common C-Plane control node 301 notifies the eNB 82 of completion of the process relating to changing of communication paths (Path Switch Request ack: S315: Communication processing step). In this signal, information (TU-1 and TU-2) for identifying two communication paths and information (S-ID1 and S-ID2) for identifying two sessions are included in association with information (an UP2 ID) for identifying the fourth U-Plane control node 242. The eNB 82 can identify a node that becomes the other party of the communication path on the basis of this information.

Thereafter, release of resources relating to communication paths is directed from the eNB 82 to the eNB 81

(Release Resource: S316). In addition, the common C-Plane control node 301 performs a session release process by directing the first C-Plane control node 211 of the slice SL1 and the second C-Plane control node 221 of the slice SL2, which have set communication paths with the eNB 81, to release sessions (Delete Session Request/Response: S317 and S318: Communication processing step). The orders of the resource release direction (S316) from the eNB 82 to the eNB 81 and the session release directions (S317 and S318) from the common C-Plane control node 301 may be interchanged.

In accordance with the process described above, the UE 90 can transmit/receive user data to/from the fourth U-Plane control node 242 through the eNB 82 and thus can use the services S1 and S2 through the eNB 82.

In addition, while the third case described above has been described as a case in which, in the area SA #2 of the moving destination, the slice SL4 corresponding to the slice SL1 is present, and a slice corresponding to the slice SL2 is not present, an opposite case may be applied. In other words, also in a case in which a slice corresponding to the slice SL1 is not present, and the slice SL5 corresponding to the slice SL2 is present, the process may be performed using a method similar to that used in the process described above.

In the process described above, at a time point (S315) at which a communication path between the eNB 82 and the fourth U-Plane control node 242 is set up, resources relating to the communication path on the eNB 81 side are not released. Accordingly, after a state in which the communication path before change and the communication path after change coexist is formed, the process relating to changing of a communication path is performed.

In other words, after the process of setting up the communication path after change is performed, a process relating to the release of the communication path before change is performed. In this way, a state in which the communication path before change and the communication path after change coexist is formed.

(Fourth Case: Case in which Communication Path with One Slice is Set Up, and Information can be Acquired from SSF)

Figure 14:
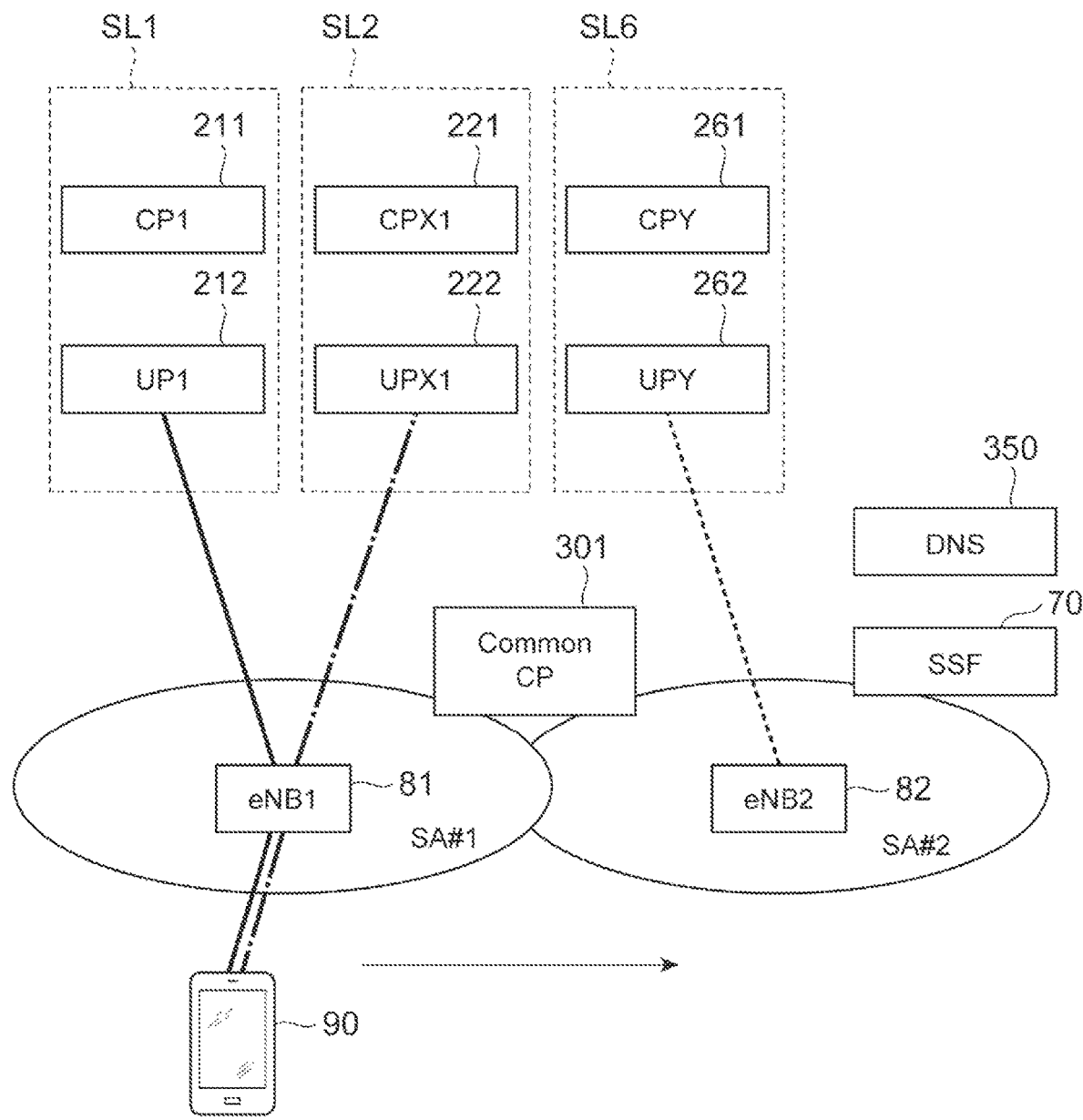
FIG. 14 is a diagram illustrating a situation relating to a fourth case.

FIG. 14 is a diagram illustrating a situation of the fourth case. The case illustrated in FIG. 14 is, similar to the case of the third case, a case in which the UE 90 moves from an area SA #1 in which the UE 90 can use services S1 and S2 by communicating with slices SL1 and SL2 to another area SA #2. In this case, not only a base station device when the UE 90 communicates is changed from the eNB 81 to the eNB 82 through handover, but slices with which the UE 90 communicates for using the services S1 and S2 need to be changed. However, in the area SA #2 of the movement destination, there are cases in which slices corresponding to the slices SL1 and SL2 are not present. In other words, similar to the third case, this is a case in which, in a case in which an inquiry is made for the DNS server 350, information relating to the C-Plane control server cannot be acquired from the DNS server 350.

In such a case, as a method for continuously using two services, in the fourth case, the functions of both a communication path between the eNB 81 before movement and the first U-Plane control node 212 and a communication path between the eNB 81 before movement and the second U-Plane control node 222 are switched to a communication path with a sixth U-Plane control node (UPY) 262 disposed in a slice SL6 having no relation to the two services. In the slice SL6, a sixth C-Plane control node (CPY) 261 and the sixth U-Plane control node 262 are included.

In addition, a slice with which a communication path needs to be set up by the eNB 82 in the area SA #2 of a movement destination of the UE 90 for enabling the UE 90 to use the services S1 and S2 is not known to the eNB 82, the common C-Plane control node 301, the UE 90, and the like. In addition, in a case in which the DNS server 350 does not perceive that the slice SL6 is compatible with the services S1 and S2, also the DNS server 350 cannot provide the information for the common C-Plane control node 301. For this reason, the common C-Plane control node 301 acquires information by inquiring the SSF 70 thereof.

The sequence of a specific process in the fourth case as described above will be described with reference to FIG. 15.

First, transmission/reception of signals relating to handover is performed between the eNB 81 of the UE 90 before movement and the eNB 82 of a movement destination (HO Request, HO Request ACK: S401). By being triggered upon this signal, a process relating to handover is performed among the UE 90, the eNB 81, and the eNB 82 (Handover Execution: S402).

Thereafter, a signal executing a request relating to changing of a communication path is transmitted from the eNB 82 of a movement destination to the common C-Plane control node 301 (Path Switch Request: S403: change request acquiring step).

Figure 15:
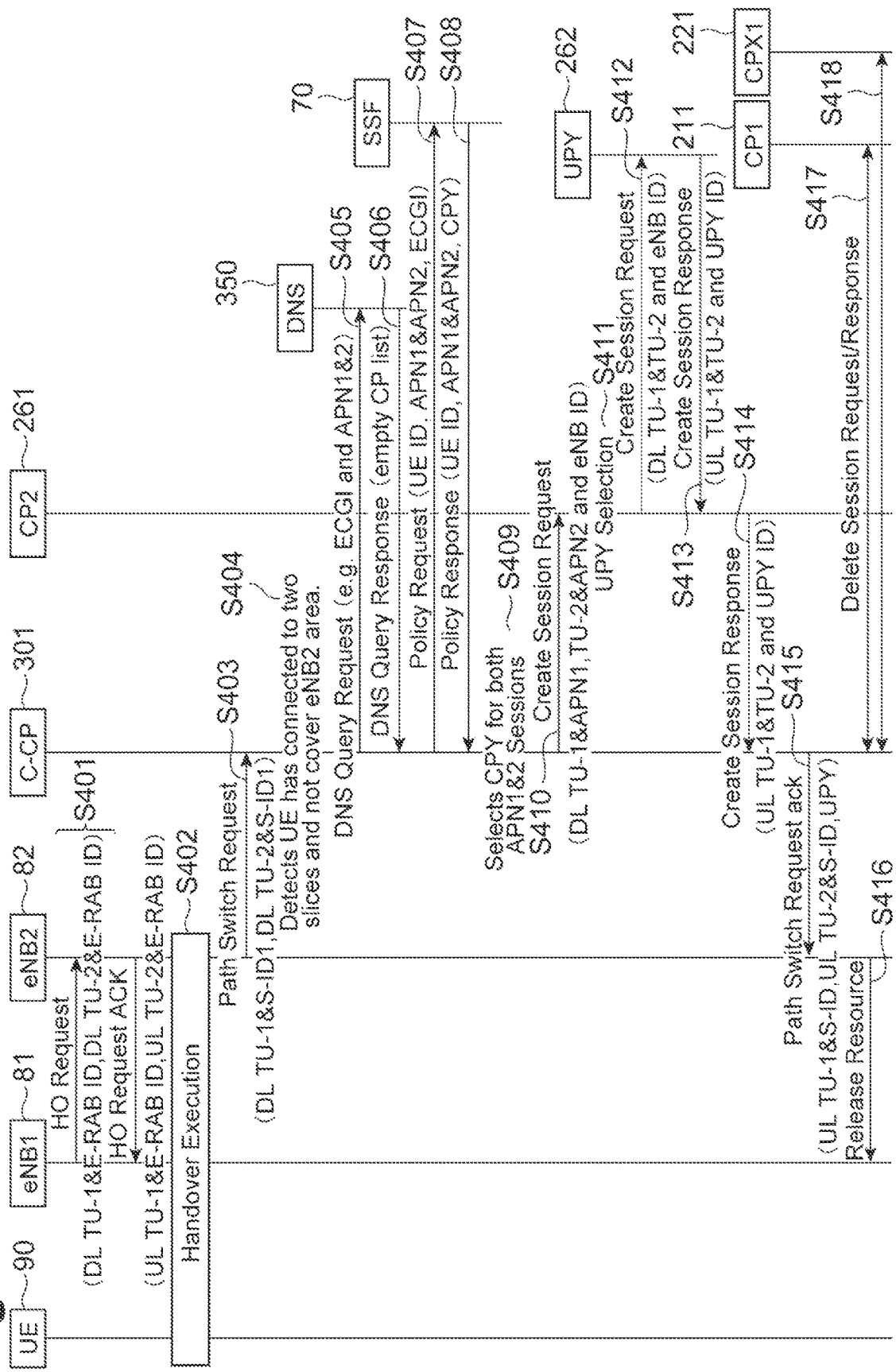
FIG. 15 is a sequence diagram illustrating a process relating to the fourth case.

In a request relating to changing of a communication path, information for identifying a UE 90, information for identifying a communication path (TU-1 and TU-2), and information for identifying a session (S-ID1 and S-ID2) are included. When the change request acquiring unit 310 of the common C-Plane control node 301 receives a request from the eNB 82, the determination unit 320 determines whether or not the UE 90 has set up communication paths with two slices on the basis of the information included in the request relating to changing of communication paths (S404: Determination step). In this embodiment, in a case in which a plurality of pieces of information for identifying communication paths and a plurality of pieces of information for identifying sessions are included in the request relating to changing of a communication path, the determination unit 320 can determine that two communication paths are individually set up for the UE 90. In this way, the determination unit 320 determines whether or not a plurality of communication paths are set up on the basis of the information included in the request relating to changing of a communication path. Then, in a case in which the determination unit 320 determines that a plurality of communication paths are set up for the UE 90, the following process illustrated in FIG. 15 is performed. In addition, in a case in which the determination unit 320 determines that a plurality of communication paths have not been set up for the UE 90, in other words, for the UE 90, a communication path has been set up with only one slice, or no communication path has been set up, a process relating to known handover is performed.

In addition, the determination unit 320 checks that two slices SL1 and SL2 do not cover an area controlled by the eNB 82 (S404). This point is similar to the second case.

In a case in which the determination unit 320 checks that a plurality of communication paths are set up for the UE 90, and the slices SL1 and SL2 do not cover the area SA #2, the communication processing unit 330 of the common C-Plane control node 301 inquires the DNS server 350 of information relating to a slice when a communication path is set up through the eNB 82 (DNS Query Request: S405: Communication processing step). More specifically, the communication processing unit 330 transmits E-URAN cell global IDs (ECGI) or APNs (APN1&2) of service servers providing the services S1 and S2 to the DNS server 350 and acquires information for identifying C-Plane control nodes of slices with which communication is to be performed when the services S1 and S2 are used. The ECGI is information for identifying a cell in which the UE 90 is present, in other words, is information representing the position of the UE 90.

In the fourth case, the area SA #2 controlling the eNB 82 is in a state that is not included in a table illustrated in FIG. 13(A). In other words, a state in which information for identifying a slice of an access destination (a destination in which a communication path is set up) is not associated with the location and the service type is formed. Accordingly, the DNS server 350 notifies the common C-Plane control node 301 of information representing that a slice corresponding to the service is not present, in other words, information representing that there is no information of the C-Plane control node (DNS Query Response: S406: Communication Processing step).

In this way, in a case in which information for identifying the C-Plane control node is not provided from the DNS server 350, a slice of the other party in which a communication path with the eNB 82 is set up for the UE 90 to use the services S1 and S2 cannot be identified on the common C-Plane control node 301 side. Thus, the communication processing unit 330 of the common C-Plane control node 301 makes an inquiry by transmitting the information for identifying a UE 90 and information (APN1 & APN2) for identifying a service desired to be used and the ECGI to the SSF 70 (Policy Request: S407: Communication processing step).

In contrast to this, the SSF 70 identifies a slice in which a communication path for using the services can be set up in an area in which the UE 90 is present on the basis of the information for identifying services to be used, the EGCI, and the information stored by its own device. As illustrated in FIG. 13(C), the SSF 70 stores information for identifying a slice that is compatible with each service and thus provides information of a corresponding slice using this information (Policy Response: S408: Communication processing step).

The common C-Plane control node 301 determines arrangement of sessions with the slice SL6, in which the sixth C-Plane control node 261 is included, relating to two services on the basis of the information supplied from the SSF 70 (Selects CPY for both APN1&2 Sessions: S409: Communication processing step).

In this way, in a case in which an appropriate slice (the C-Plane control node) cannot be selected using the information supplied from the DNS server 350, a configuration in which the SSF 70 storing information for identifying a slice corresponding to a service is inquired is employed. In this way, information relating to an appropriate slice (the C-Plane control node) for using two services can be acquired.

In addition, in a case in which the DNS server 350 and the SSF 70 cannot provide information for identifying an appropriate slice for the information (APN1 & APN2) for identifying services desired to be used, the services cannot be provided, and the provision of the services stops.

The communication processing unit 330 transmits a request for arranging a new session relating to the UE 90 to the C-Plane control node identified in the process described until now, in other words, the sixth C-Plane control node 261 (Create Session Request: S410: Communication processing step). In the request for creating a session, information (an eNB ID) for identifying an eNB 82 that is an access destination, information (TU-1 and TU-2) for identifying a communication path set up in accordance with creation of a session, and information (APN1 and APN2) for identifying a service are included. In this way, also in the sixth C-Plane control node 261, establishment of sessions relating to two services is recognized.

When a session creation request is received, the sixth C-Plane control node 261 performs a process relating to creation of a communication path in accordance with a known sequence on the basis of the request. More specifically, as a U-Plane control node creating a communication path, the sixth U-Plane control node 262 of the same slice SL6 is selected (UP Selection: S411). Thereafter, the sixth C-Plane control node 261 transmits information (an eNB ID) for identifying an eNB 82 to the sixth U-Plane control node 262 together with information (TU-1 and TU-2) for identifying communication paths, thereby directing to create communication paths (Create Session Request: S412). After performing a process relating to creation of communication paths, the sixth U-Plane control node 262 transmits a notification indicating execution of the process of creating communication paths to the sixth C-Plane control node 261 together with the information (TU-1 and TU-2) for identifying communication paths and information (a UP2 ID) for identifying its own node as a response (Create Session Response: S413). The sixth C-Plane control node 261 that has received a response from the sixth U-Plane control node 262 notifies the common C-Plane control node 301 of completion of the process relating to the creation of communication paths as a response to the session creation request (S410) (Create Session Response: S414: Communication processing step).

When the response (S414) from the fourth C-Plane control node 241 is received, the common C-Plane control node 301 notifies the eNB 82 of completion of the process relating to changing of communication paths (Path Switch Request ack: S415: Communication processing step). In this signal, information (TU-1 and TU-2) for identifying two communication paths and information (S-ID1 and S-ID2) for identifying two sessions are included in association with information (an UPY ID) for identifying the sixth U-Plane control node 262. The eNB 82 can identify a node that becomes the other party of the communication path on the basis of this information.

Thereafter, release of resources relating to communication paths is directed from the eNB 82 to the eNB 81 (Release Resource: S416). In addition, the common C-Plane control node 301 performs a session release process by directing the first C-Plane control node 211 of the slice SL1 and the second C-Plane control node 221 of the slice SL2, which have set communication paths with the eNB 81, to release sessions (Delete Session Request/Response: S417 and S418: Communication processing step). The orders of the resource release direction (S416) from the eNB 82 to the eNB 81 and the session release directions (S417 and S418) from the common C-Plane control node 301 may be interchanged.

In accordance with the process described above, the UE 90 can transmit/receive user data to/from the sixth U-Plane control node 262 through the eNB 82 and thus can use the services S1 and S2 through the eNB 82.

In the process described above, at a time point (S415) at which a communication path between the eNB 82 and the sixth U-Plane control node 262 is set up, resources relating to the communication path on the eNB 81 side are not released. Accordingly, after a state in which the communication path before change and the communication path after change coexist is formed, the process relating to changing of a communication path is performed.

In other words, after the process of setting up the communication path after change is performed, a process relating to the release of the communication path before change is performed. In this way, a state in which the communication path before change and the communication path after change coexist is formed.

As described above, according to the common C-Plane control node 301 that is the communication control device according to the first embodiment and the communication control method using this common C-Plane control node 301, common to the four cases described above, the process relating to changing of a communication path is performed while a state in which a communication path before change and a communication path after change coexist is formed. For this reason, the UE 90 can maintain a state in which user data can be transmitted and received using the communication path before change or the communication path after change. Accordingly, it can be realized to change communication paths set up with a plurality of slices while services assigned to a plurality of slices are used.

In addition, common to the four cases described above, after the process of setting up communication paths after change is performed, the process relating to release of communication paths before change is performed. In this way, even in a case in which the UE 90 is in a state of being connected to a plurality of slices, a state in which communication paths before change and communication paths after change coexist is formed.

In addition, in the second case, each of a plurality of communication paths before change is switched to a communication path set up in the U-Plane control node of the slices SL4 and SL5, which are different from each other, different from the slices SL1 and SL2 in which communication paths before change are set up. By employing such a configuration, communication paths are individually set up also after change for each communication path before change, and accordingly, user data can be appropriately transmitted and received also after the changing of communication paths.

On the other hand, in the third case and the fourth case, a plurality of communication paths before change are changed to one communication path set up in the U-Plane control node of a slice different from the slices SL1 and SL2 in which communication paths before change are set up (the slice SL4 in the third case, and the slice SL6 in the fourth case). Although described in the embodiment described above, there are cases in which a communication path corresponding to a communication path cannot be individually set up for each of control nodes of a plurality of slices before change. In such a case, as described above, by employing a configuration in which a plurality of communication paths before change are arranged into one communication path set up in a control node of one slice, also after the communication paths are changed, user data relating to a plurality of services can be appropriately transmitted and received.

In addition, in the third case and the fourth case, although a configuration in which a plurality of communication paths (in the embodiment described above, two communication paths) are arranged into one communication path has been described, a plurality of communication paths arranged into one communication path in this way may be not all the communication paths set up in the UE 90. For example, in a case in which the UE 90 sets up three communication paths before change, two communication paths among the three communication paths are arranged into one communication path after change, and the remaining one communication path may be separately set up as one communication path also after change. In this case, the number of communication paths after change relating to the UE 90 is two. In this way, all the communication paths relating to the UE 90 may not be arranged into one communication path. This point may be similarly applied also to a second embodiment to be described later.

Second Embodiment: System Integrally Performing Management of Communication Paths Using C-Plane Control Node Next, a case in which a communication control device according to the present invention is applied to a network configuration having no common C-Plane control node will be described.

Figure 16:
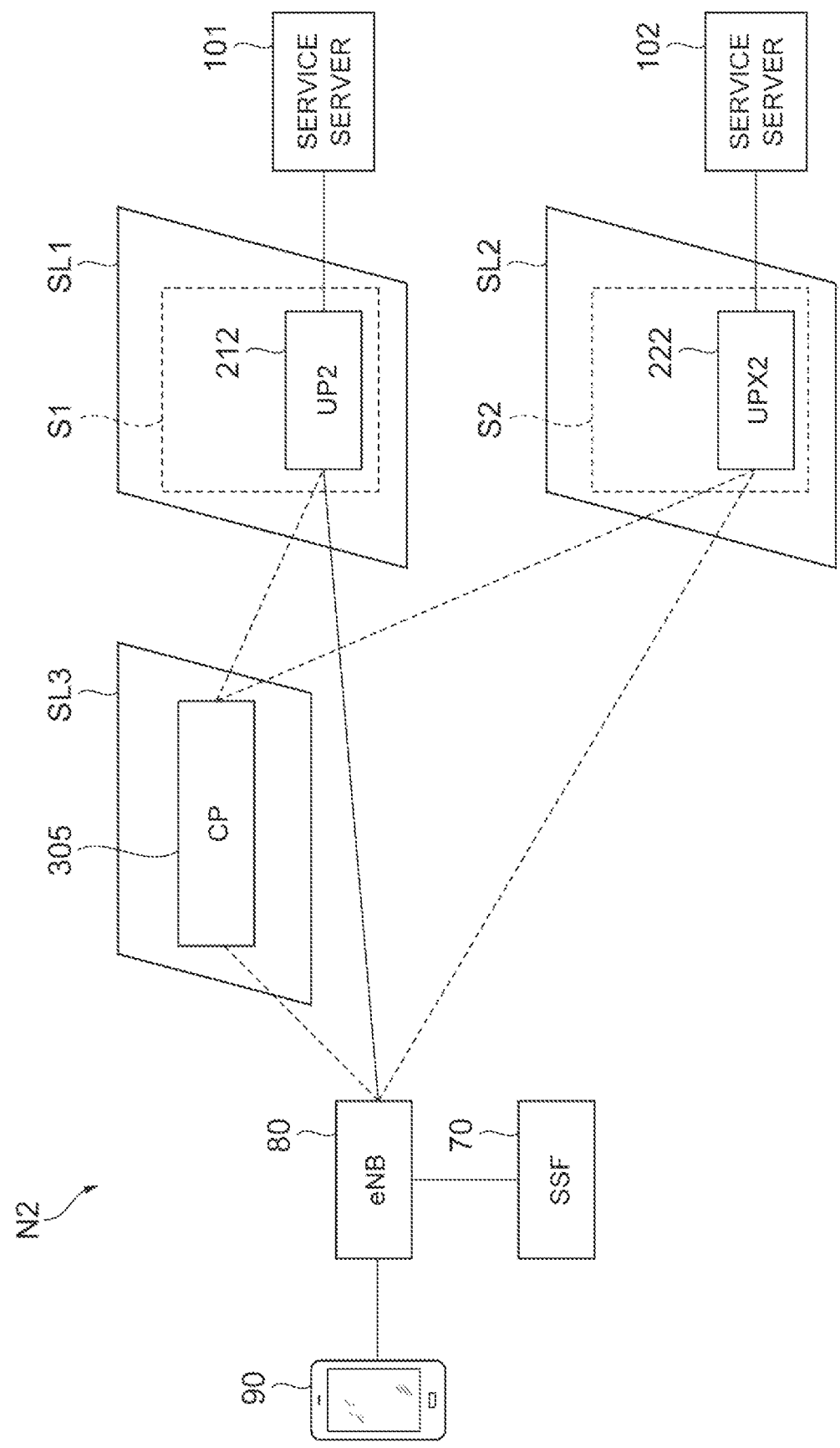
FIG. 16 is a diagram illustrating a relation between slices and a core network according to a second embodiment.

FIG. 16 is a diagram illustrating a core network N2 including a slice configuration built into a system according to the second embodiment and corresponds to FIG. 2 according to the first embodiment.

As illustrated in FIG. 16, also in the second embodiment, a slice SL1 (a first slice) that is a slice for a first service (a service S1), a slice SL2 (a second slice) that is a slice for a second service (a service S2), and a slice SL3 (a third slice) that is a slice having a function as a control device relating to control of the slice SL1 or the slice SL2 are created. An NFVO 30 assigns the service S1 to the slice SL1 and assigns the service S2 to the slice SL2. A function for executing the service S1 and the service S2 performs a process on the basis of a signal transmitted from the slice SL3 and the like and performs a process of requesting the slice SL3 including a node having the function as the communication control device to provide information.

In the second embodiment, the C-Plane control node is not disposed in the slices SL1 and SL2 corresponding to the services S1 and S2. In other words, as a node relating to the service S1, only a first U-Plane control node (UP1) 212 of the slice SL1 is present. In addition, as a node relating to the service S2, only a second U-Plane control node (UPX1) 222 of the slice SL2 is present.

In addition, a C-Plane control node 305 is included in the slice SL3. The C-Plane control node 305 executes a process relating to establishment and disconnection of a communication path between a user and each slice on the basis of a direction from the user side. In other words, in the second embodiment, a C-Plane control node is not disposed as a node in a slice providing a service, and the C-Plane control node 305 disposed in the slice SL3 performs a process relating to establishment and disconnection of a communication path for each slice through which data passes when a service is used. This point is different from the first embodiment.

In the system according to the second embodiment, the C-Plane control node 305 disposed in the slice SL3 has the function of the common C-Plane control node 301 according to the first embodiment and the function of a C-Plane control node disposed in each slice. In other words, the C-Plane control node 305 functions as a communication control device performing control of communication paths relating to a UE 90 disposed in the control node of a plurality of slices.

In addition, in an evolved packer core (EPC) of an LTE network, for example, a mobility management entity (MME) may be configured to have a function relating to the C-Plane control node 305 according to the second embodiment. In addition, for example, a serving gateway (SGW) and a packet data network gateway (PGW) may be configured to have a function relating to a U-Plane control node according to the second embodiment.

In such a system according to the second embodiment, a process in a case in which it is necessary to change a slice with which the UE 90 communicates for using a service or change a communication path between a slice and the UE 90 in a certain condition when the UE 90 communicates with a plurality of slices will be described. In the system according to the second embodiment, the process described above is independently executed by the C-Plane control node 305. For this reason, similar to the common C-Plane control node 301, the C-Plane control node 305 includes the change request acquiring unit 310, the determination unit 320, and the communication processing unit 330 illustrated in FIG. 5.

The function of each unit is similar to that of the common C-Plane control node 301. The change request acquiring unit 310 has a function for acquiring a request relating to changing of a communication/reception path with the slice SL1 and the like. In addition, the determination unit 320 has a function for determining whether or not a UE 90 that is a target for a request relating to changing of a communication path has set up a communication path with a plurality of slices. In addition, the communication processing unit 330 performs a process on the basis of a request relating to changing of a communication path such that the communication path can be changed while the UE 90 is using a service.

Next, a specific process of changing of a communication path relating to the UE 90 in the core network N2 including the C-Plane control node 305 will be described. In a case in which the communication path is changed while the UE 90 is using a plurality of services, similar to the first embodiment, four cases may be conceived. Hereinafter, situations of the four cases will be described, and a specific process will be described with reference to a sequence diagram. In addition, many parts of contents of the processes of the four cases are common to those according to the first embodiment, and thus description thereof may be simplified.

(First Case: Case in which Only Communication Path is Changed)

Figure 17:
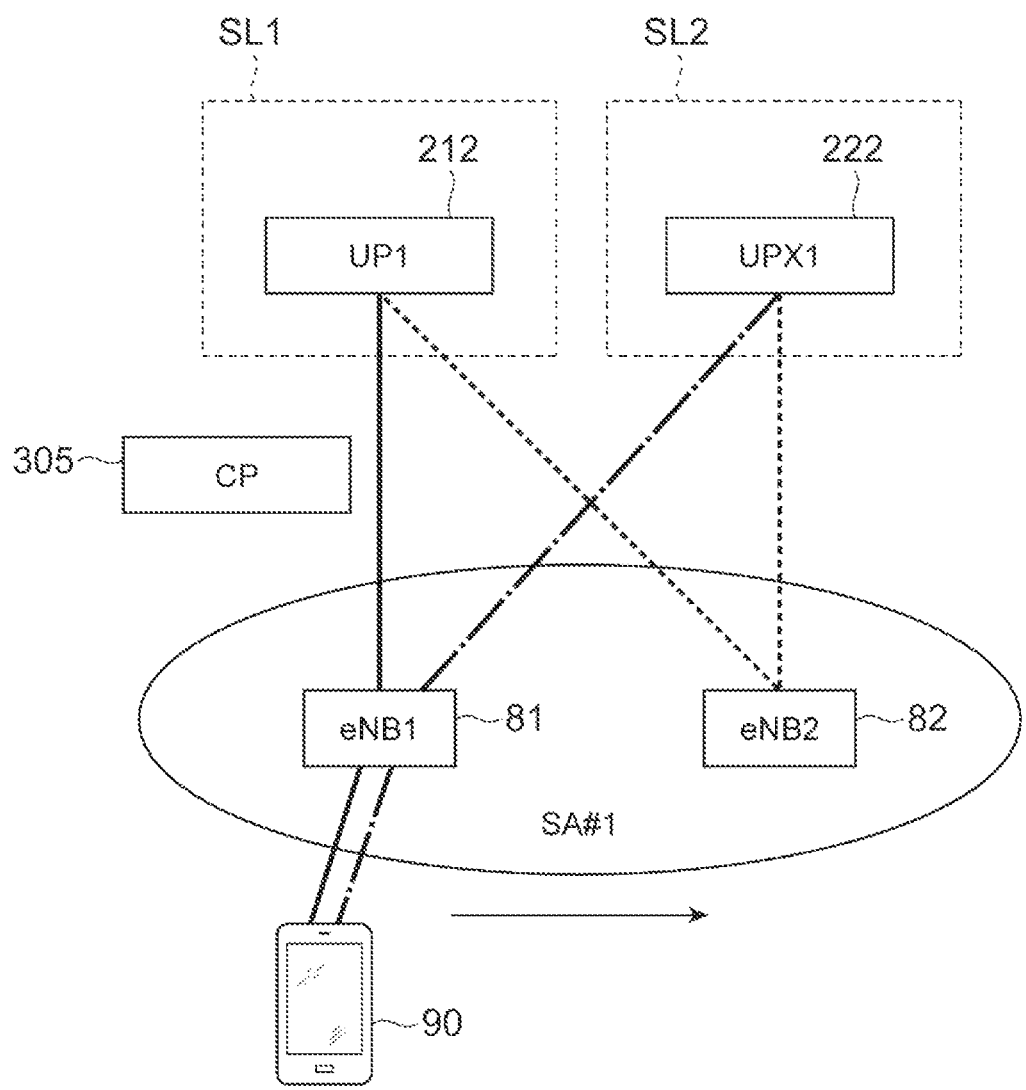
FIG. 17 is a diagram illustrating a situation relating to a first case.

FIG. 17 is a diagram illustrating a situation of the first case. The case illustrated in FIG. 17, for example, is a case in which a UE 90 moves within an area SA #1 in which the UE 90 can use services S1 and S2 by performing communication between slices SL1 and SL2. In this case, while a base station device when the UE 90 performs communication is changed from an eNB 81 to an eNB 82 through handover, the services S1 and S2 can be used by continuously communicating with the slices SL1 and SL2. Accordingly, a communication path before movement between the eNB 81 and the first U-Plane control node 212 is switched to a communication path between the eNB 82 and the first U-Plane control node 212, and a communication path before movement between the eNB 81 and the second U-Plane control node 222 is switched to a communication path between the eNB 82 and the second U-Plane control node 222, whereby the services S1 and S2 can be continuously used.

The sequence of a specific process in such a case will be described with reference to FIG. 18.

First, transmission/reception of signals relating to handover is performed between the eNB 81 of the UE 90 before movement and the eNB 82 of a movement destination (HO Request, HO Request ACK: S501). By being triggered upon this signal, a process relating to handover is performed among the UE 90, the eNB 81, and the eNB 82 (Handover Execution: S502).

Thereafter, a signal executing a request relating to changing of a communication path is transmitted from the eNB 82 of a movement destination to the C-Plane control node 305 (Path Switch Request: S503: Change request acquiring step). In addition, here, since a case in which the UE 90 performs handover is described, a signal for executing a request relating to changing of a communication path is "Path Switch Request," and a signal for executing a request relating to changing of a communication path may be appropriately changed in accordance with a situation for changing the communication path. This similarly applies to the other cases.

In a request relating to changing of a communication path, information for identifying a UE 90, information for identifying a communication path (TU-1 and TU-2), and information for identifying a session (S-ID1 and S-ID2) are included. When the change request acquiring unit 310 of the C-Plane control node 305 receives a request from the eNB 82, the determination unit 320 determines whether or not the UE 90 has set up communication paths with two slices using information included in the request relating to changing of a communication path (S504: Determination step). In a case in which the determination unit 320 determines that a plurality of communication paths are set up for the UE 90, the following process illustrated in FIG. 18 is performed. In addition, in a case in which the determination unit 320 determines that a plurality of communication paths have not been set up for the UE 90, in other words, for the UE 90, a communication path has been set up with only one slice, or no communication path has been set up, a process relating to known handover is performed.

In a case in which the determination unit 320 determines that a plurality of communication paths are set up for the UE 90, the communication processing unit 330 of the C-Plane control node 305 transmits a direction relating to changing of a communication path to the first U-Plane control node 212 and the second U-Plane control node 222 on the basis of the information for identifying a session and the like (Path Switch Request: S505 and S506: Communication processing step). In the direction relating to changing of a communication path, information for identifying an eNB 82 that is a change destination (eNB ID) and information for identifying a communication path that is a change target (TU-1 or TU-2) are included. In addition, the order (S505 and S506: Communication processing step) of transmissions of directions relating to changing of a communication path to two nodes may be changed.

When a direction relating to changing of a communication path is received, after executing a process relating to creation of a communication path, the first U-Plane control node 212 transmits a notification indicating execution of the process of creating a communication path together with information (a UP1 ID) for identifying its own node to the C-Plane control node 301 as a response (Modify Bearer Response: S507: Communication processing step). Also the second U-Plane control node 222, after executing a process relating to creation of a communication path, transmits a notification indicating execution of the process of creating a communication path together with information (a UPX1 ID) for identifying its own node to the C-Plane control node 305 as a response (Modify Bearer Response: S508: Communication processing step).

Figure 18:
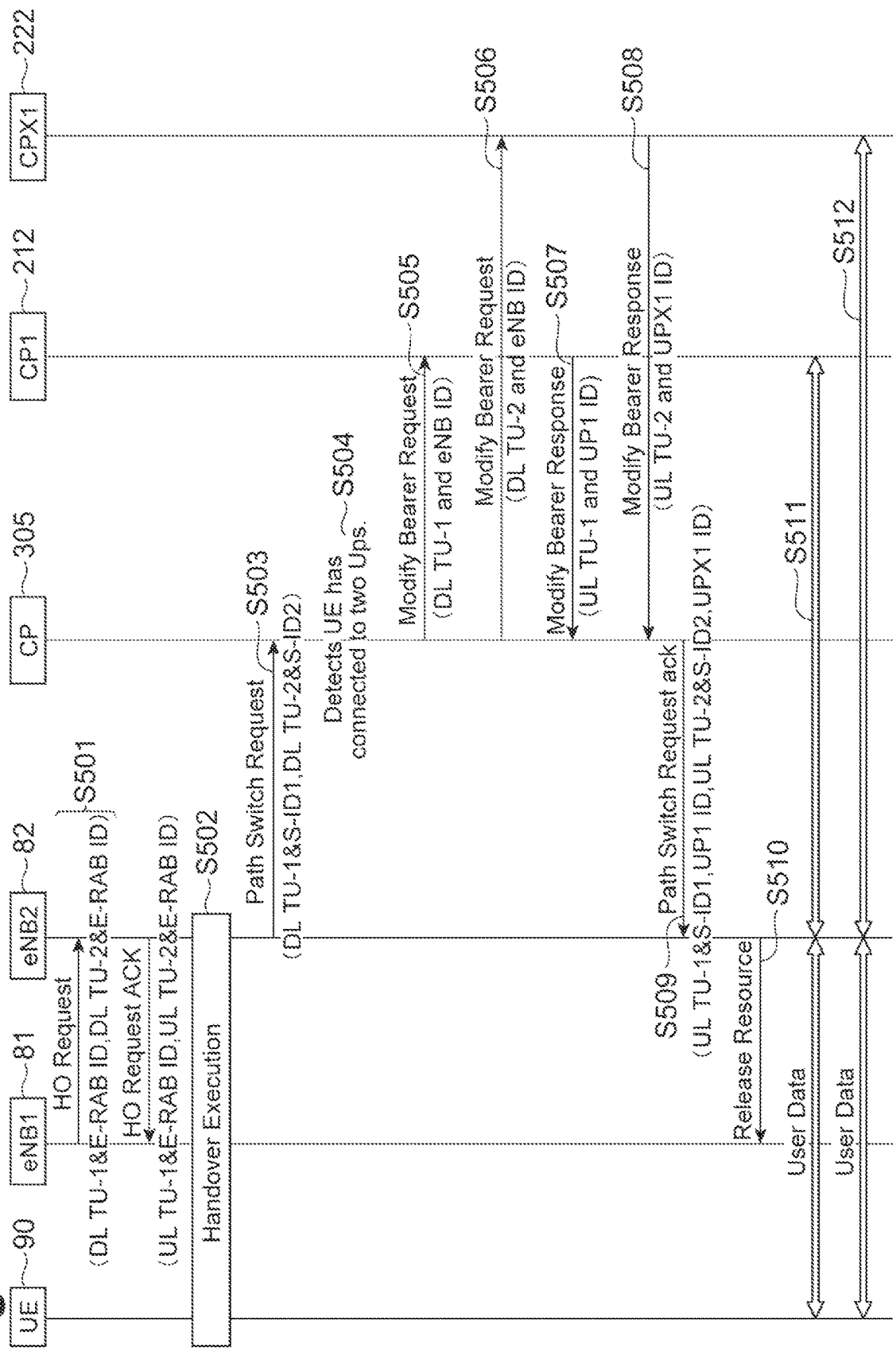
FIG. 18 is a sequence diagram illustrating a process relating to the first case.

In addition, since the process of the slice SL1 and the process of the slice SL2 are individually performed, the order of the processes (S505 to S508) described above may be different from the order illustrated in FIG. 18.

When a response (S507) from the first U-Plane control node 212 and a response (S508) from the second U-Plane control node 222 are received, the common C-Plane control node 305 notifies the eNB 82 of completion of the process relating to changing of a communication path (Path Switch Request ack: S509: Communication processing step). In this signal, information (a UP1 ID) for identifying the first U-Plane control node 212 and information (a UPX1 ID) for identifying the second U-Plane control node 222 are included. The eNB 82 can identify a node that is the other party of the communication path on the basis of this information.

Thereafter, release of resources relating to the communication path is directed from the eNB 82 to the eNB 81 (Release Resource: S510). In this way, the UE 90 can transmit/receive user data to/from the first U-Plane control node 212 through the eNB 82 (S511) and can transmit/receive user data to/from the second U-Plane control node 222 through the eNB 82 (S512). In this way, the UE 90 can use the services S1 and S2 through the eNB 82.

In the process described above, at a time point at which communication paths between the eNB 82 and the first U-Plane control node 212 and the second U-Plane control node 222 are set up (S509), resources relating to the communication paths are not released on the eNB 81 side. Accordingly, after a state in which the communication paths before change and the communication paths after change coexist are formed, a process relating to changing of a communication path is performed.

In the process described above, at a time point at which communication paths between the eNB 82 and the first U-Plane control node 212 and the second U-Plane control node 222 are set up (S509), resources relating to the communication paths are not released on the eNB 81 side. Accordingly, after a state in which the communication paths before change and the communication paths after change coexist are formed, a process relating to changing of a communication path is performed.

In other words, after the process of setting up communication paths after change is performed, the process relating to release of the communication paths before change is performed. In this way, a state in which the communication paths before change and the communication paths after change coexist is formed.

(Second Case: Case in which Communication Paths are Newly Set Up in Two Slices)

Figure 19:
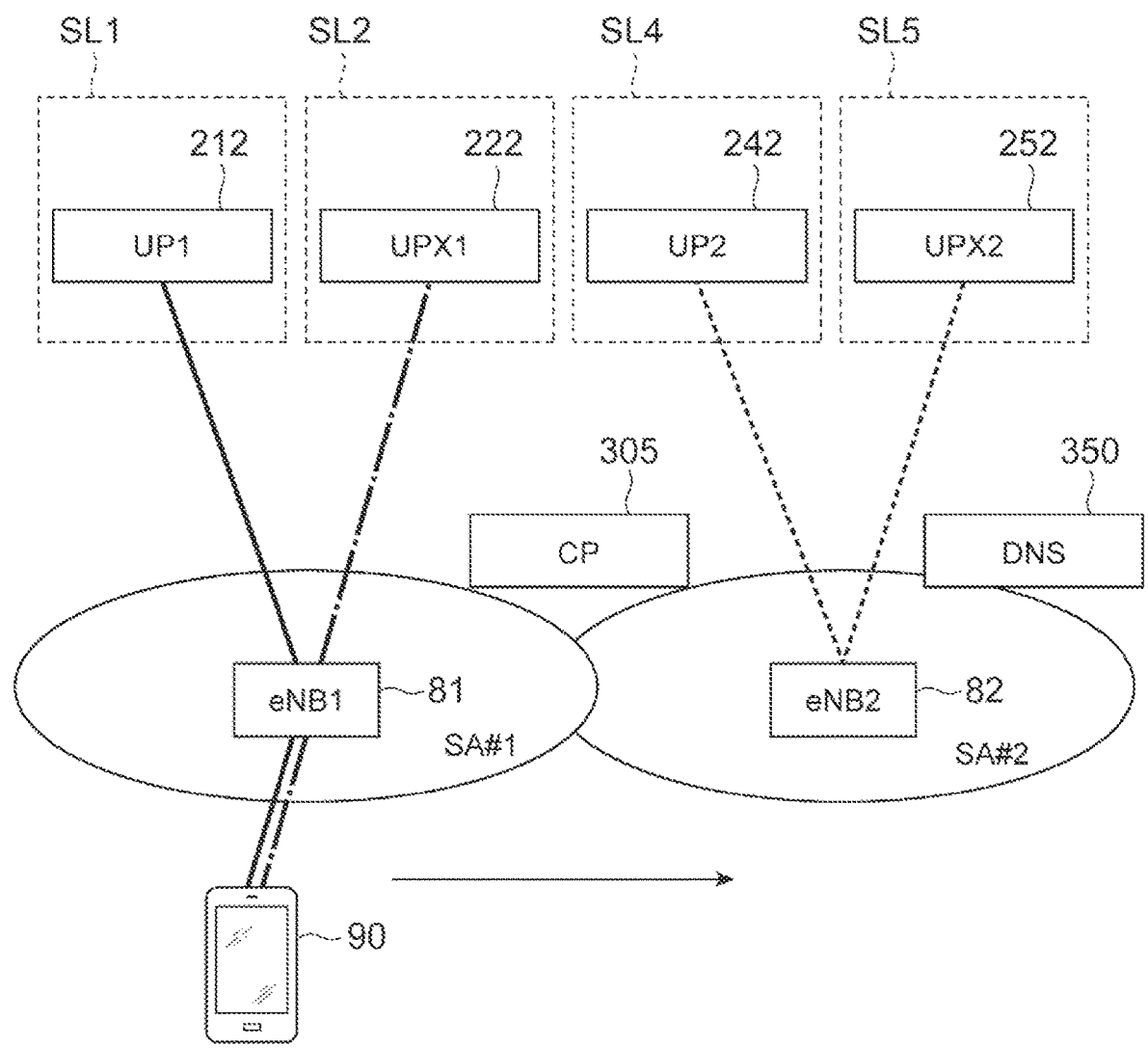
FIG. 19 is a diagram illustrating a situation relating to a second case.

FIG. 19 is a diagram illustrating a situation of the second case. The case illustrated in FIG. 19 is, for example, is a case in which the UE 90 moves from an area SA #1 to an area SA #2. In this case, not only a base station device when the UE 90 communicates is changed from the eNB 81 to the eNB 82 through handover, but slices with which communication is performed for using the services S and S2 are changed from the slices the SL1 and SL2 to the slices SL4 and SL5. In other words, a communication path between the eNB 81 before movement and the first U-Plane control node 212 is switched to a communication path between the eNB 82 and the fourth U-Plane control node 242. In addition, a communication path between the eNB 81 before movement and the second U-Plane control node 222 is switched to a communication path between the eNB 82 and the fifth U-Plane control node 252. In addition, information relating to the slices SL4 and SL5 is acquired as the C-Plane control node 305 inquires a domain name system (DNS) server 350 of the information, which is similar to the first embodiment.

The sequence of a specific process in such a case will be described with reference to FIG. 20.

First, transmission/reception of signals relating to handover is performed between the eNB 81 of the UE 90 before movement and the eNB 82 of a movement destination (HO Request, HO Request ACK: S601). By being triggered upon this signal, a process relating to handover is performed among the UE 90, the eNB 81, and the eNB 82 (Handover Execution: S602).

Thereafter, a signal executing a request relating to changing of a communication path is transmitted from the eNB 82 of a movement destination to the C-Plane control node 305 (Path Switch Request: S603: Change request acquiring step).

In a request relating to changing of a communication path, information for identifying a UE 90, information for identifying a communication path (TU-1 and TU-2), and information for identifying a session (S-ID1 and S-ID2) are included. When the change request acquiring unit 310 of the C-Plane control node 305 receives a request from the eNB 82, the determination unit 320 determines whether or not the UE 90 has set up communication paths with two slices using information included in the request relating to changing of a communication path (S604: Determination step). Then, in a case in which the determination unit 320 determines that a plurality of communication paths are set up for the UE 90, the following process illustrated in FIG. 19 is performed. In addition, in a case in which the determination unit 320 determines that a plurality of communication paths have not been set up for the UE 90, in other words, for the UE 90, a communication path has been set up with only one slice, or no communication path has been set up, a process relating to known handover is performed.

In addition, the determination unit 320 checks that two slices SL1 and SL2 do not cover an area controlled by the eNB 82 (S604).

In a case in which the determination unit 320 checks that a plurality of communication paths are set up for the UE 90, and the slices SL1 and SL2 do not cover the area controlled by the eNB 82, the communication processing unit 330 of the C-Plane control node 305 inquires the DNS server 350 of information relating to a slice when a communication path is set up through the eNB 82 (DNS Query Request/Response: S605: Communication processing step). More specifically, information for identifying a C-Plane control node that can perform communication when the services S and S2 are used through the eNB 82 is acquired. As a result, the communication processing unit 330 identifies a U-Plane control node 242 of a slice (here, the slice SL4) in which a communication path is to be set up for using the service S1 and a U-Plane control node 252 of a slice (here, the slice SL5) in which a communication path is to be set up for using the service S2 on the basis of an access point name (APN) of a service server transmitting/receiving user data to/from the eNB 82 and the position of the UE 90 (in other words, information of the eNB 82 to be accessed) from information relating to the C-Plane control node acquired from the DNS server 350 (S606: Communication processing step).

The communication processing unit 330 transmits a request for creating a new session relating to the UE 90 to the two U-Plane control nodes that have been identified, in other words, the fourth U-Plane control node 242 and the fifth U-Plane control node 252 (Create Session Request: S607 and S208: Communication processing step). In the request for creating a session, information (an eNB ID) for identifying an eNB 82 of an access destination and information (TU-1 or TU-2) for identifying a communication path set up in accordance with creation of a session are included. In addition, the order of transmissions of the requests for creating a session (S607 and S608) to the two nodes may be changed.

When a request for creating a session is received, after executing a process relating to creating a communication path on the basis of the request, the fourth U-Plane control node 242 notifies the C-Plane control node 305 of an indication of execution of the process of creating a communication path together with information (a UP2 ID) for identifying its own node (Create Session Response: S609: Communication processing step). When a request for creating a session is received, after executing a process relating to creating a communication path, the fifth U-Plane control node 252 notifies the C-Plane control node 305 of an indication of execution of the process of creating a communication path together with information (a UP2 ID) for identifying its own node (Create Session Response: S610: Communication processing step).

Figure 20:
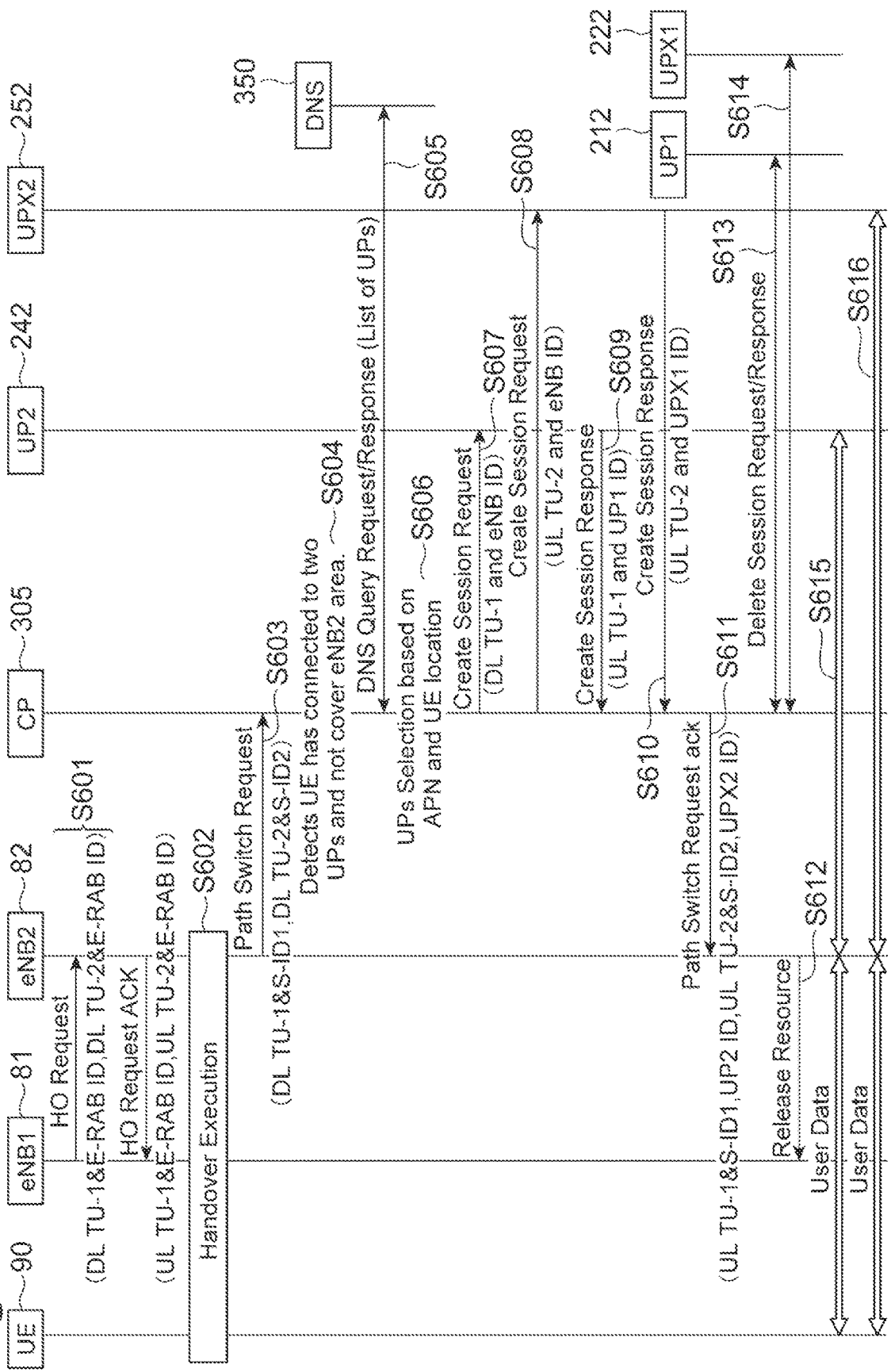
FIG. 20 is a sequence diagram illustrating a process relating to the second case.

However, since the process of the slice SL4 and the process of the slice SL5 are individually performed, the order of the processes (S607 to S610) described above may be different from the order illustrated in FIG. 20.

When a response (S609) from the fourth U-Plane control node 242 and a response (S610) from the fifth U-Plane control node 252 are received, the C-Plane control node 305 notifies the eNB 82 of completion of the process relating to changing of a communication path (Path Switch Request ack: S611: Communication processing step). In this signal, information (a UP2 ID) for identifying the fourth U-Plane control node 242 and information (a UPX2 ID) for identifying the fifth U-Plane control node 252 are included. The eNB 82 can identify a node that is the other party of the communication path on the basis of this information.

Thereafter, release of resources relating to the communication path is directed from the eNB 82 to the eNB 81 (Release Resource: S612). In addition, the C-Plane control node 305 directs the first U-Plane control node 212 of the slice SL1 and the second U-Plane control node 222 of the slice SL2 in which communication paths are set up with the eNB 81 to release sessions and performs a session release process (Delete Session Request/Response: S613 and S614: Communication processing step). The order of the resource release direction (S612) from the eNB 82 to the eNB 81 and the session release direction (S613 and S614) from the C-Plane control node 305 may be changed.

According to the process described above, the UE 90 can transmit/receive user data to/from the fourth U-Plane control node 242 through the eNB 82 (S615) and can transmit/receive user data to/from the fifth U-Plane control node 252 through the eNB 82 (S616). In this way, the UE 90 can use the services S1 and S2 through the eNB 82.

In the process described above, resources relating to communication paths are not released on the eNB 81 side at a time point (S611) at which communication paths between the eNB 82 and the fourth U-Plane control node 242 and the fifth U-Plane control node 252 are set up. Accordingly, after a state in which communication paths before change and communication paths after change coexist is formed, the process relating to changing of communication paths is performed.

In other words, after the process of setting up communication paths after change is performed, the process relating to release of communication paths before change is performed. In this way, a state in which the communication paths before change and the communication paths after change coexist is formed.

(Third Case: Case in which Communication Path is Set Up with One Slice, and Information can be Acquired from DNS Server)

Figure 21:
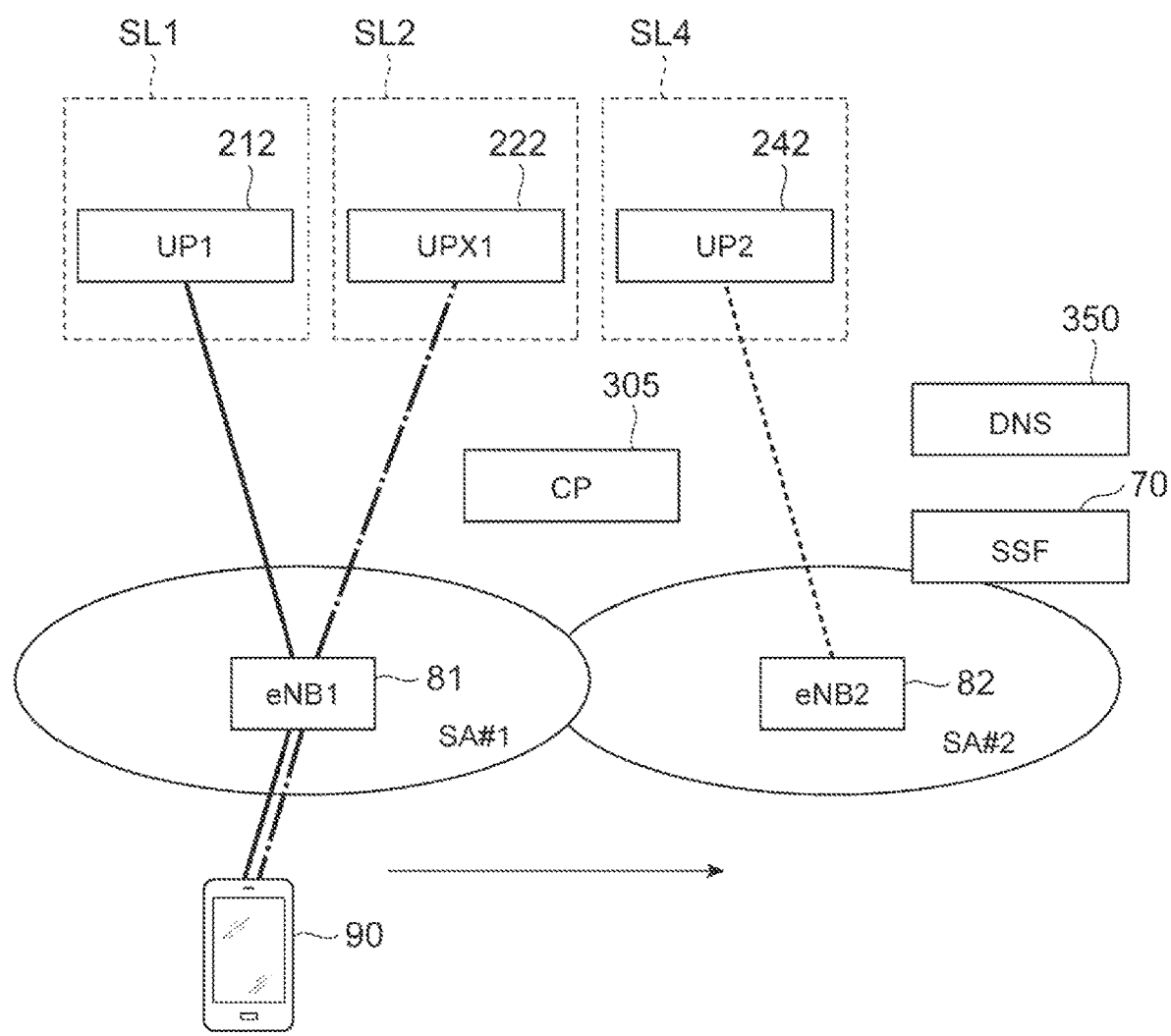
FIG. 21 is a diagram illustrating a situation relating to a third case.

FIG. 21 is a diagram illustrating a situation of the third case. The case illustrated in FIG. 21 is, for example, a case in which the UE 90 moves from an area SA #1 to an area SA #2. In this case, a base station device when the UE 90 performs communication is changed from the eNB 81 to the eNB 82 through handover. In addition, slices with which communication is performed for using the services S1 and S2 need to be changed. Here, there are cases in which a slice SL4 corresponding to the slice SL1 is present in the area SA #2 of a moving destination, a slice corresponding to the slice SL2 is not present. In the third case, functions of both a communication path between the eNB 81 before movement and the first U-Plane control node 212 and a communication path between the eNB 81 before movement and the second U-Plane control node 222 are switched to a communication path between the eNB 82 and the fourth U-Plane control node 242.

In addition, the C-Plane control node 305 makes an inquiry for the DNS server 350 and the SSF 70, thereby acquiring information for identifying slices in which communication paths for using the services S1 and S2 are set up, which is similar to the first embodiment.

The sequence of a specific process in the third case as described above will be described with reference to FIG. 22.

First, transmission/reception of signals relating to handover is performed between the eNB 81 of the UE 90 before movement and the eNB 82 of a movement destination (HO Request, HO Request ACK: S701). By being triggered upon this signal, a process relating to handover is performed among the UE 90, the eNB 81, and the eNB 82 (Handover Execution: S702).

Thereafter, a signal executing a request relating to changing of a communication path is transmitted from the eNB 82 of a movement destination to the C-Plane control node 305 (Path Switch Request: S703: change request acquiring step).

Figure 22:
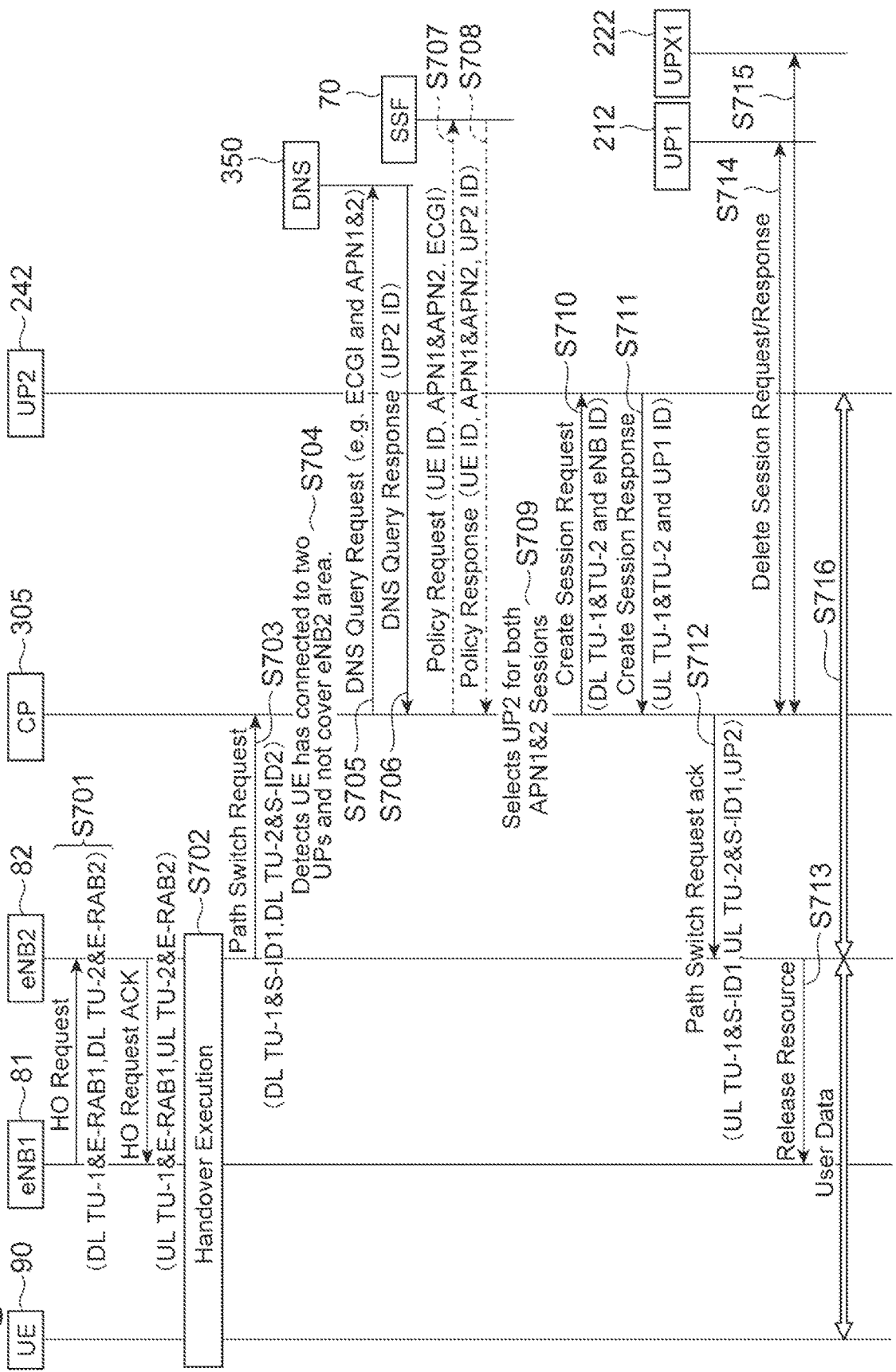
FIG. 22 is a sequence diagram illustrating a process relating to the third case.

In a request relating to changing of a communication path, information for identifying a UE 90, information for identifying a communication path (TU-1 and TU-2), and information for identifying a session (S-ID1 and S-ID2) are included. When the change request acquiring unit 310 of the C-Plane control node 305 receives a request from the eNB 82, the determination unit 320 determines whether or not the UE 90 has set up communication paths with two slices on the basis of the information included in the request relating to changing of communication paths (S704: Determination step). In a case in which the determination unit 320 determines that a plurality of communication paths are set up for the UE 90, the following process illustrated in FIG. 22 is performed. In addition, in a case in which the determination unit 320 determines that a plurality of communication paths have not been set up for the UE 90, in other words, for the UE 90, a communication path has been set up with only one slice, or no communication path has been set up, a process relating to known handover is performed.

In addition, the determination unit 320 checks that two slices SL1 and SL2 do not cover an area controlled by the eNB 82 (S704). This point is similar to the second case.

In a case in which the determination unit 320 checks that a plurality of communication paths are set up for the UE 90, and the slices SL1 and SL2 do not cover the area SA #2, the communication processing unit 330 of the common C-Plane control node 305 inquires the DNS server 350 of information relating to a slice when a communication path is set up through the eNB 82 (DNS Query Request: S705: Communication processing step). More specifically, the communication processing unit 330 transmits E-URAN cell global IDs (ECGI) or APNs (APN1&2) of service servers providing the services S1 and S2 to the DNS server 350 and acquires information for identifying C-Plane control nodes of slices with which communication is to be performed when the services S1 and S2 are used.

In the case of the third case, only information for identifying one U-Plane control node is returned in a result transmitted from the DNS server 350 (DNS Query Response: S706: Communication processing step). Here, information for identifying the fourth U-Plane control node 242 is transmitted from the DNS server 350 to the C-Plane control node 305. Accordingly, the C-Plane control node 305 determines that a session relating to the two services is arranged for a slice SL4 in which the fourth U-Plane control node 242 is included (Selects UP2 for both APN1&2 Sessions: S709: Communication processing step).

In addition, in the information stored by the DNS server 350, there are cases in which slices corresponding to the services S1 and S2 cannot be identified in an area in which the UE 90 is present. In this case, similar to the first embodiment, the communication processing unit 330 of the C-Plane control node 305 makes an inquiry by transmitting the information for identifying the UE 90, information (APN1 & APN2) for identifying a service desired to be used, and the ECGI to the SSF 70 (Policy Request: S707: Communication processing step). In this way, the SSF 70 provides information of a corresponding slice in accordance with information for identifying a service transmitted from the C-Plane control node 305 (Policy Response: S708: Communication processing step). Here, as information for identifying the slice SL4, information for identifying the fourth U-Plane control node 242 is provided.

Then, the C-Plane control node 305 determines arrangement of sessions relating to two services with the slice SL4 in which the fourth U-Plane control node 241 is included on the basis of the information from the DNS server 350 and the information from the SSF 70 (Selects UP2 for both APN1&2 Sessions: S709: Communication processing step).

In this way, in a case in which an appropriate slice (the U-Plane control node) cannot be selected only using the information stored by the DNS server 350, the C-Plane control node 305 inquires the SSF 70 as a configuration in which information for identifying a slice corresponding to a service is stored by the SSF 70, and accordingly, an appropriate slice (the U-Plane control node) for using the two services may be configured to be identified. Also this point is similar to the first embodiment.

In addition, in a case in which the DNS server 350 and the SSF 70 cannot provide information for identifying an appropriate slice for the information (APN1 & APN2) for identifying services desired to be used, the services cannot be provided, and the provision of the services stops.

The communication processing unit 330 transmits a request for arranging a new session relating to the UE 90 to the U-Plane control node identified in the process described until now, in other words, the fourth U-Plane control node 242 (Create Session Request: S710: Communication processing step). In the request for creating a session, information (an eNB ID) for identifying an eNB 82 that is an access destination, information (TU-1 and TU-2) for identifying a communication path set up in accordance with creation of a session, and information (APN1 and APN2) for identifying a service are included. In this way, also in the fourth U-Plane control node 242, establishment of sessions relating to two services is recognized.

After executing a process relating to creating a communication path, the fourth U-Plane control node 242 notifies the C-Plane control node 305 of an indication of execution of the process of creating a communication path together with information for identifying communication paths (TU-1 and TU-2) and information (a UP2 ID) for identifying its own node (Create Session Response: S711: Communication processing step).

When a response (S711) from the fourth U-Plane control node 242 is received, the C-Plane control node 305 notifies the eNB 82 of completion of the process relating to changing of a communication path (Path Switch Request ack: S712: Communication processing step). In this signal, information (TU-1 and TU-2) for identifying two communication paths and information (S-ID1 and S-ID2) for identifying two sessions are included in association with information (a UP2 ID) for identifying the fourth U-Plane control node 242. The eNB 82 can identify a node that is the other party of the communication path on the basis of this information.

Thereafter, release of resources relating to the communication path is directed from the eNB 82 to the eNB 81 (Release Resource: S713). In addition, the C-Plane control node 305 directs the first U-Plane control node 212 of the slice SL1 and the second U-Plane control node 222 of the slice SL2 in which communication paths are set up with the eNB 81 to release sessions and performs a session release process (Delete Session Request/Response: S714 and S715: Communication processing step). The order of the resource release direction (S713) from the eNB 82 to the eNB 81 and the session release direction (S714 and S715) from the C-Plane control node 305 may be changed.

According to the process described above, the UE 90 can transmit/receive user data to/from the fourth U-Plane control node 242 through the eNB 82 and accordingly, can use the services S1 and S2 through the eNB 82 (S716).

In addition, while the third case described above has been described as a case in which, in the area SA #2 of the moving destination, the slice SL4 corresponding to the slice SL1 is present, and a slice corresponding to the slice SL2 is not present, an opposite case may be applied. In other words, also in a case in which a slice corresponding to the slice SL1 is not present, and the slice SL5 corresponding to the slice SL2 is present, the process may be performed using a method similar to that used in the process described above.

In the process described above, at a time point (S712) at which a communication path between the eNB 82 and the fourth U-Plane control node 242 is set up, resources relating to the communication path on the eNB 81 side are not released. Accordingly, after a state in which the communication path before change and the communication path after change coexist is formed, the process relating to changing of a communication path is performed.

In other words, after the process of setting up the communication path after change is performed, a process relating to the release of the communication path before change is performed. In this way, a state in which the communication path before change and the communication path after change coexist is formed.

(Fourth Case: Case in which Communication Path with One Slice is Set Up, and Information can be Acquired from SSF)

Figure 23:
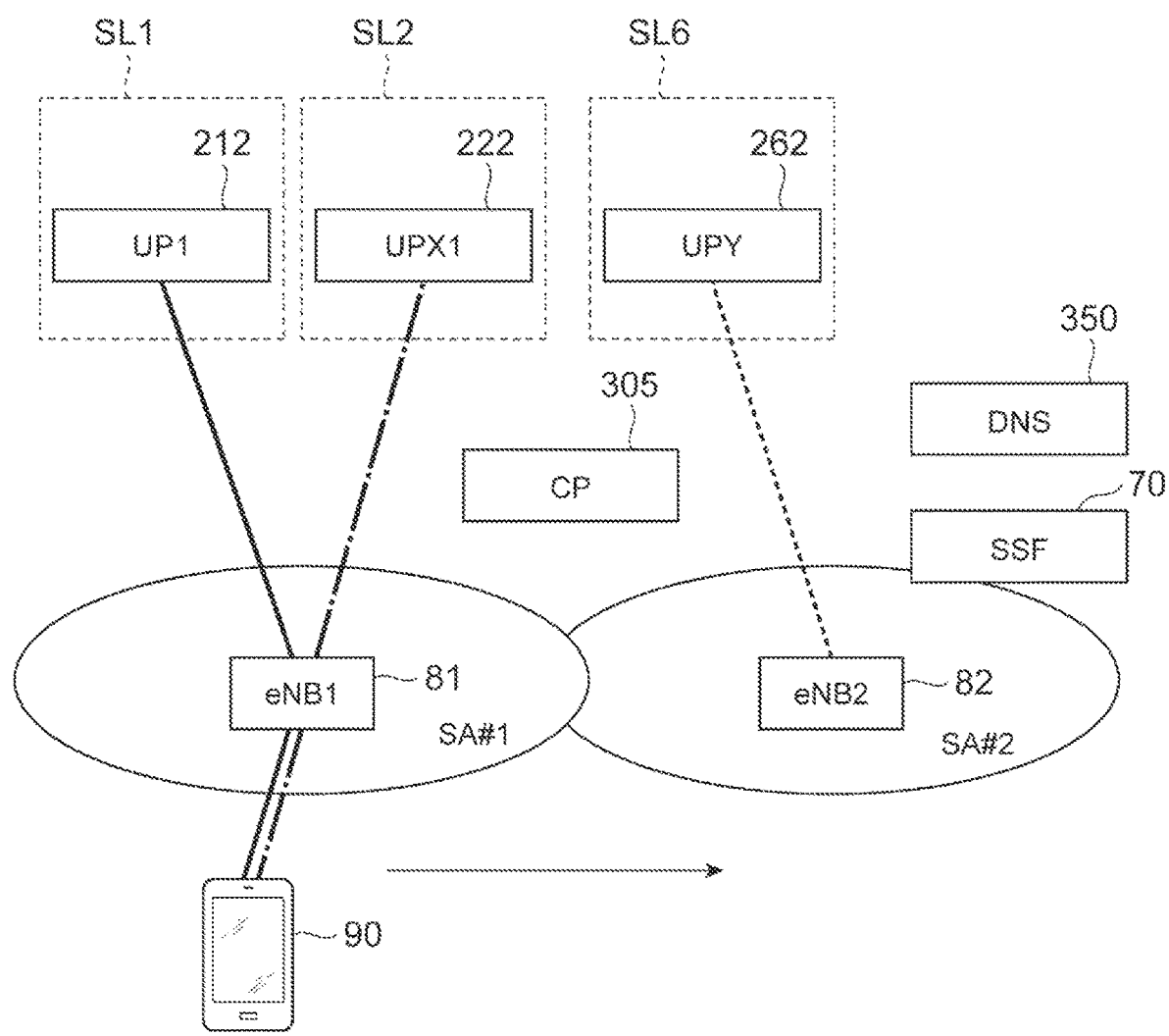
FIG. 23 is a diagram illustrating a situation relating to a fourth case.

FIG. 23 is a diagram illustrating a situation of the fourth case. The case illustrated in FIG. 23 is, similar to the case of the third case, a case in which the UE 90 moves from an area SA #1 to an area SA #2. However, slices corresponding to the slices SL1 and SL2 are not identified in the area SA #2 of the movement destination, and, similar to the third case, this is a case in which, in a case in which an inquiry is made for the DNS server 350, information relating to the C-Plane control server cannot be acquired from the DNS server 350. In the fourth case, communication paths are switched to a communication path with a sixth U-Plane control node (UPY) 262 disposed in a slice SL6 having no relation to two services.

In addition, the C-Plane control node 305 makes an inquiry for the DNS server 350 and the SSF 70, thereby acquiring information for identifying slices in which communication paths for using the services S1 and S2 are set up, which is similar to the first embodiment.

The sequence of a specific process in the fourth case as described above will be described with reference to FIG. 24.

First, transmission/reception of signals relating to handover is performed between the eNB 81 of the UE 90 before movement and the eNB 82 of a movement destination (HO Request, HO Request ACK: S801). By being triggered upon this signal, a process relating to handover is performed among the UE 90, the eNB 81, and the eNB 82 (Handover Execution: S802).

Thereafter, a signal executing a request relating to changing of a communication path is transmitted from the eNB 82 of a movement destination to the C-Plane control node 305 (Path Switch Request: S803: change request acquiring step).

Figure 24:
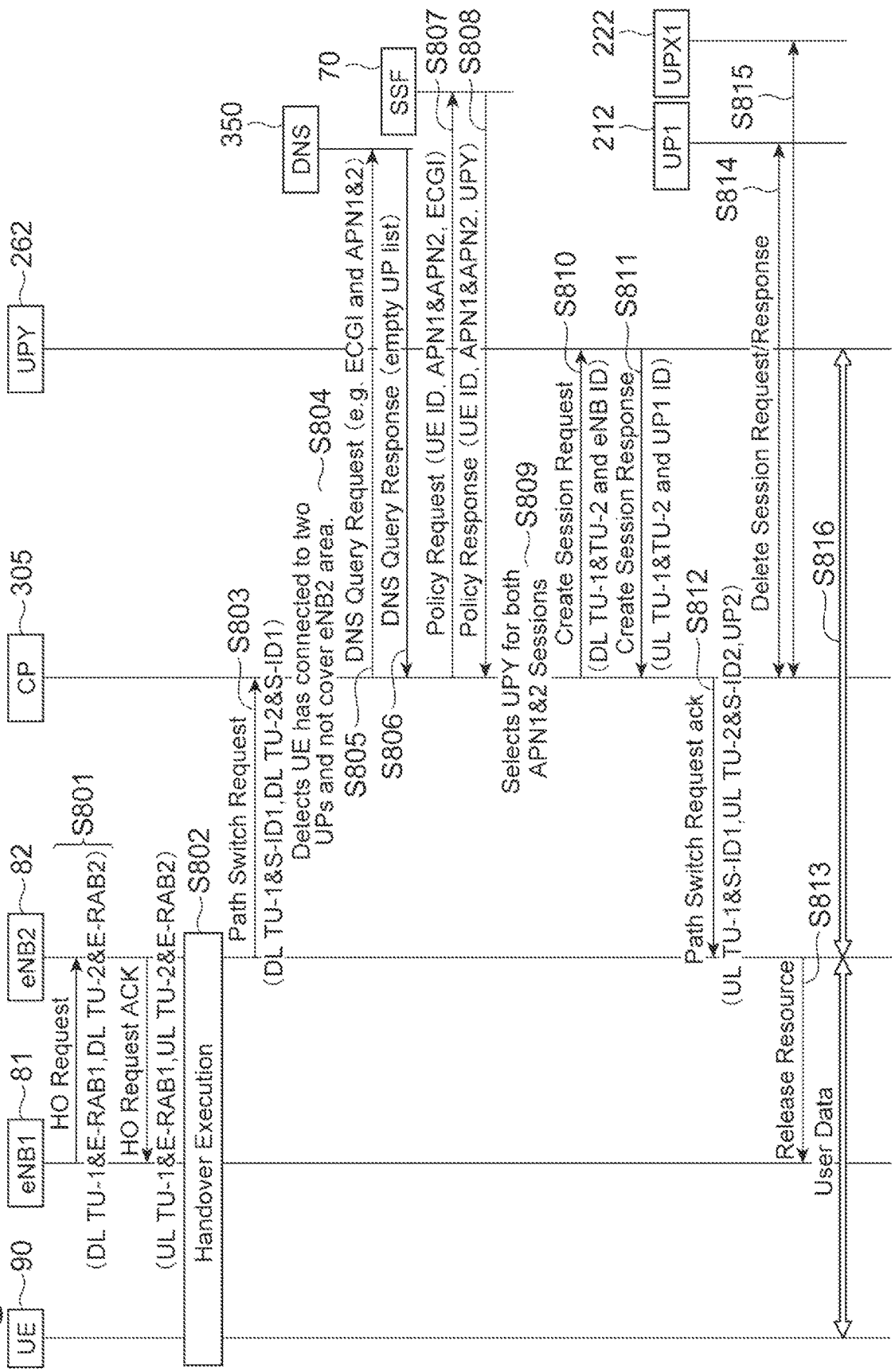
FIG. 24 is a sequence diagram illustrating a process relating to the fourth case.

In a request relating to changing of a communication path, information for identifying a UE 90, information for identifying a communication path (TU-1 and TU-2), and information for identifying a session (S-ID1 and S-ID2) are included. When the change request acquiring unit 310 of the C-Plane control node 305 receives a request from the eNB 82, the determination unit 320 determines whether or not the UE 90 has set up communication paths with two slices on the basis of the information included in the request relating to changing of communication paths (S804: Determination step). In a case in which the determination unit 320 determines that a plurality of communication paths are set up for the UE 90, the following process illustrated in FIG. 24 is performed. In addition, in a case in which the determination unit 320 determines that a plurality of communication paths have not been set up for the UE 90, in other words, for the UE 90, a communication path has been set up with only one slice, or no communication path has been set up, a process relating to known handover is performed.

In addition, the determination unit 320 checks that two slices SL1 and SL2 do not cover an area controlled by the eNB 82 (S804). This point is similar to the second case.

In a case in which the determination unit 320 checks that a plurality of communication paths are set up for the UE 90, and the slices SL1 and SL2 do not cover the area SA #2, the communication processing unit 330 of the C-Plane control node 305 inquires the DNS server 350 of information relating to a slice when a communication path is set up through the eNB 82 (DNS Query Request: S805: Communication processing step). More specifically, the communication processing unit 330 transmits E-URAN cell global IDs (ECGI) or APNs (APN1 &2) of service servers providing the services S1 and S2 to the DNS server 350 and acquires information for identifying U-Plane control nodes of slices with which communication is to be performed when the services S1 and S2 are used.

In the fourth case, the area SA #2 controlling the eNB 82 is in a state that is not included in a table illustrated in FIG. 13(A). In other words, a state in which information for identifying a slice of an access destination (a destination in which a communication path is set up) is not associated with the location and the service type. Accordingly, the DNS server 350 notifies the C-Plane control node 305 of information representing that a slice corresponding to the service is not present, in other words, information representing that there is no information of the C-Plane control node (DNS Query Response: S806: Communication Processing step).

In this way, in a case in which information for identifying the C-Plane control node is not provided from the DNS server 350, a slice of the other party in which a communication path with the eNB 82 is set up for the UE 90 to use the services S1 and S2 cannot be identified on the C-Plane control node 305 side. Thus, the communication processing unit 330 of the C-Plane control node 305 makes an inquiry by transmitting the information for identifying a UE 90 and information (APN1 & APN2) for identifying a service desired to be used and the ECGI to the SSF 70 (Policy Request: S807: Communication processing step).

In contrast to this, the SSF 70, on the basis of the information for identifying services to be used and the EGCI, identifies a slice in which a communication path for using the services can be set up in an area in which the UE 90 is present on the bais of the information stored by its own device and provides information of a corresponding slice (Policy Response: S808: Communication processing step).

The C-Plane control node 305 determines arrangement of sessions with the slice SL6, in which the sixth U-Plane control node 262 is included, relating to two services on the basis of the information supplied from the SSF 70 (Selects UPY for both APN1&2 Sessions: S809: Communication processing step).

In addition, in a case in which the DNS server 350 and the SSF 70 cannot provide information for identifying an appropriate slice for the information (APN1 & APN2) for identifying services desired to be used, the services cannot be provided, and the provision of the services stops.

The communication processing unit 330 transmits a request for arranging a new session relating to the UE 90 to the C-Plane control node identified in the process described until now, in other words, the sixth U-Plane control node 262 (Create Session Request: S810: Communication processing step). In the request for creating a session, information (an eNB ID) for identifying an eNB 82 that is an access destination, information (TU-1 and TU-2) for identifying a communication path set up in accordance with creation of a session, and information (APN1 and APN2) for identifying a service are included. In this way, also in the sixth U-Plane control node 262, establishment of sessions relating to two services is recognized.

When a request for creating a session is received, after executing a process relating to creating a communication path, the sixth U-Plane control node 262 notifies the C-Plane control node 305 of an indication of execution of the process of creating a communication path together with information for identifying communication paths (TU-1 and TU-2) and information (a UP2 ID) for identifying its own node (Create Session Response: S811: Communication processing step).

When a response (S811) from the sixth U-Plane control node 262 is received, the C-Plane control node 305 notifies the eNB 82 of completion of the process relating to changing of a communication path (Path Switch Request ack: S812: Communication processing step). In this signal, information (TU-1 and TU-2) for identifying two communication paths and information (S-ID1 and S-ID2) for identifying two sessions are included in association with information (an UPY ID) for identifying the sixth U-Plane control node 262. The eNB 82 can identify a node that becomes the other party of the communication path on the basis of this information.

Thereafter, release of resources relating to communication paths is directed from the eNB 82 to the eNB 81 (Release Resource: S813). In addition, the C-Plane control node 305 performs a session release process by directing the first U-Plane control node 212 of the slice SL1 and the second U-Plane control node 222 of the slice SL2, which have set communication paths with the eNB 81, to release sessions (Delete Session Request/Response: S814 and S815: Communication processing step). The orders of the resource release direction (S813) from the eNB 82 to the eNB 81 and the session release directions (S814 and S815) from the C-Plane control node 305 may be interchanged.

In accordance with the process described above, the UE 90 can transmit/receive user data to/from the sixth U-Plane control node 262 through the eNB 82 and thus can use the services S1 and S2 through the eNB 82 (S816).

In the process described above, at a time point (S812) at which a communication path between the eNB 82 and the sixth U-Plane control node 262 is set up, resources relating to the communication path on the eNB 81 side are not released. Accordingly, after a state in which the communication path before change and the communication path after change coexist is formed, the process relating to changing of a communication path is performed.

In other words, after the process of setting up the communication path after change is performed, a process relating to the release of the communication path before change is performed. In this way, a state in which the communication path before change and the communication path after change coexist is formed.

As described above, also according to the C-Plane control node 305 that is the communication control device according to the second embodiment and the communication control method using this C-Plane control node 305, common to the four cases described above, the process relating to changing of a communication path is performed while a state in which a communication path before change and a communication path after change coexist is formed. For this reason, the UE 90 can maintain a state in which user data can be transmitted and received using the communication path before change or the communication path after change. Accordingly, it can be realized to change communication paths set up with a plurality of slices while services assigned to a plurality of slices are used.

In addition, common to the four cases described above, after the process of setting up communication paths after change is performed, the process relating to release of communication paths before change is performed. In this way, even in a case in which the UE 90 is in a state of being connected to a plurality of slices, a state in which communication paths before change and communication paths after change coexist is formed.

In addition, in the second case, each of a plurality of communication paths before change is switched to a communication path set up in the U-Plane control node of the slices SL4 and SL5, which are different from each other, different from the slices SL1 and SL2 in which communication paths before change are set up. By employing such a configuration, communication paths are individually set up also after change for each communication path before change, and accordingly, user data can be appropriately transmitted and received also after the changing of communication paths.

On the other hand, in the third case and the fourth case, a plurality of communication paths before change are changed to one communication path set up in the U-Plane control node of a slice different from the slices SL1 and SL2 in which communication paths before change are set up (the slice SL4 in the third case, and the slice SL6 in the fourth case). Although described in the embodiment described above, there are cases in which a communication path corresponding to a communication path cannot be individually set up for each of control nodes of a plurality of slices before change. In such a case, as described above, by employing a configuration in which a plurality of communication paths before change are arranged into one communication path set up in a control node of one slice, also after the communication paths are changed, user data relating to a plurality of services can be appropriately transmitted and received.

As above, while the present invention has been described in detail, it is apparent to a person skilled in the art that the present invention is not limited to the embodiments described in this specification. The present invention may be modified or changed without departing from the concept and the scope of the present invention set in accordance with the claims. Thus, the description presented in this specification is for the purpose of exemplary description and does not have any limited meaning for the present invention.

Notification of information is not limited to an aspect/embodiment described in this specification and may be performed using a difference method. For example, the notification of information may be performed using physical layer signaling (for example, downlink control information (DCI), uplink control information (UCI), upper layer signaling (for example, radio resource control (RRC) signaling, medium access control (MAC) signaling, a master information block (MIB), a system information block (SIB)), any other signal, or a combination thereof. In addition, the RRC signaling may be referred to as a RRC message and, for example, may be an RRC connection setup message, an RRC connection reconfiguration message, or the like.

Each aspect/embodiment described in this specification may be applied to long term evolution (LTE), LTE-advanced (LTE-A), Super 3G IMT-advanced, 4G; 5G, future ratio access (FRA), W-CDMA (Registered trademark), GSM (registered trademark), CDMA 2000, ultra mobile broadband (UMB), IEEE 802.11 (Wi-Fi), IEEE 802.16 (WiMAX), IEEE 802.20, ultra-wideband (UWB), Bluetooth (registered trademark), a system using another appropriate system and/or a next generation system extended based on these.

The processing sequence, the sequence, the flowchart, and the like of each aspect/embodiment described in this specification may be changed in order as long as there is no contradiction. For example, in a method described in this specification, elements of various steps are presented in an exemplary order, and the method is not limited to the presented specific order.

In this specification, a specific operation performed by a specific device may be performed by an upper node thereof depending on the situation. For example, in a case in which the specific device is a base station, in a network configured by one or a plurality of network nodes having the base station, it is apparent that various operations performed for communication with a terminal may be performed by the base station or another network node other than the base station. In the description presented above, although a case in which there is one other network node other than the base station has been illustrated as an example, the other network may be a combination of a plurality of other network nodes.

Information and the like may be output from an upper layer (or a lower layer) to a lower layer (or an upper layer).

The information and the like may be input and output through a plurality of network nodes.

The input/output information and the like may be stored in a specific place (for example, a memory) or managed using a management table. The input/output information and the like may be overwritten, updated, or additionally written. The output information and the like may be deleted. The input information and the like may be transmitted to another device.

A judgment may be performed using a value ("0" or "1") represented by one bit, may be performed using a Boolean value (true or false), or may be performed using a comparison between numerical values (for example, a comparison with a predetermined value).

The aspects/embodiments described in this specification may be individually used, used in combination, or be switched therebetween in accordance with execution. In addition, a notification of predetermined information (for example, a notification of being X) is not limited to be performed explicitly and may be performed implicitly (for example, a notification of the predetermined information is not performed).

It is apparent that software, regardless whether it is called software, firmware, middleware, a microcode, a hardware description language, or any other name, be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, and the like may be transmitted and received via a transmission medium. For example, in a case in which software is transmitted from a website, a server, or any other remote source using wiring technologies such as a coaxial cable, an optical fiber cable, a twisted pair, a digital subscriber line (DSL) and the like and/or radio technologies such infrared rays, radio waves, and microwaves, and the like, such wiring technologies and/or radio technologies are included in the definition of the transmission medium.

Information, a signal, and the like described in this specification may be represented using any one among other various technologies. For example, data, an instruction, a command, information, a signal, a bit, a symbol, a chip, and the like described over the entire description presented above may be represented using a voltage, a current, radiowaves, a magnetic field or magnetic particles, an optical field or photons, or an arbitrary combination thereof.

In addition, a term described in this specification and/or a term that is necessary for understanding this specification may be substituted with terms having the same meaning or a meaning similar thereto. For example, a signal may be a message.

Terms "system" and "network" used in this specification are compatibly used.

In addition, information, a parameter, and the like described in this specification may be represented using absolute values, relative values from predetermined values, or other corresponding information. For example, radio resources may be directed using indices.

A name used for each parameter described above is not limited in any aspect. In addition, numerical equations using such parameters may be different from those that are explicitly disclosed in this specification. Various channels (for example, a PUCCH, a PDCCH, and the like) and information elements (for example, a TPC and the like) can be identified using all the preferred names, and various names assigned to such various channels and information elements are not limited in any aspect.

The base station (eNB) according to this embodiment can house one or a plurality of (for example, three) cells (also called as a sector). In a case in which the base station houses a plurality of cells, the entire coverage area of the base station can be partitioned into a plurality of smaller areas, and, for each of the smaller areas, a communication service may be provided using a base station sub-organization (for example, an indoor small base station (a remote radio head (RRH)). A term such as "cell" or "sector" represents a part or the whole of a coverage area of a base station and/or a base station sub-organization providing a communication service for this coverage. In addition, terms such as a "base station," an "eNB," and a "sector" may be compatibly used in this specification. The base station may be called using a term such as a fixed station, a NodeB, an eNodeB (eNB), an access point, a Femto cell, a small cell, or the like.

A user terminal may be called as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a hand set, a user agent, a mobile client, a client, or any other appropriate term by persons skilled in the art.

Terms such as "determining" used in this specification may include various operations of various types. The "determining," for example, may include a case in which judging, calculating, computing, processing, deriving, investigating, looking up (for example, looking up a table, a database, or any other data structure), or ascertaining is regarded as "determining." In addition, "determining" may include a case in which receiving (for example, receiving information), transmitting (for example, transmitting information), input, output, or accessing (for example, accessing data in a memory) is regarded as "determining." Furthermore, "determining" may include a case in which resolving, selecting, choosing, establishing, comparing, or the like is regarded as "determining." In other words, "determining" includes a case in which a certain operation is regarded as "determining."

Terms such as "connected" or "coupled" or all the modifications thereof mean all the kinds of direct or indirect connection or coupling between two or more elements and may include presence of one or more intermediate elements between two elements that are mutually "connected" or "coupled." Coupling or connection between elements may be physical coupling or connection, logical coupling or connection, or a combination thereof. When used in this specification, two elements may be conceived as being mutually "connected" or "coupled" by using one or more wires, cables and/or print electric connections and, as several non-limiting and non-comprehensive examples, by using electromagnetic energy such as electromagnetic energy having wavelengths in a radio frequency region, a microwave region, and a light (both visible light and non-visible light) region.

Description of "on the basis of" used in this specification does not mean "only on the basis of" unless otherwise mentioned. In other words, description of "on the basis of" means both "only on the basis of" and "at least on the basis of."

In this specification, in a case in which names such as "first," "second," and the like is used, referring to each element does not generally limit the amount or the order of such an element. Such names may be used in this specification as a convenient way for distinguishing two or more elements from each other. Accordingly, referring to the first and second elements does not mean that only the two elements are employed therein or the first element precedes the second element in a certain form.

As long as "including," "comprising," and modifications thereof are used in this specification or the claims, such terms are intended to be inclusive like a term "comprising." In addition, a term "or" used in this specification or the claims is intended to be not an exclusive logical sum.

Other than a case in which clearly only one device is present in a context or technically, a device includes a plurality of devices.

In the entirety of the present disclosure, unless a singularity is represented clearly from the context, it includes a plurality thereof.

REFERENCE SIGNS LIST 80, 81, 82 eNB
90 UE
211, 221, 241, 251, 261, 305 C-Plane control node
212, 222, 242, 252, 262 U-Plane control node
301 Common C-Plane control node
SL1 to SL6 Slice

The invention claimed is:

1. A communication control device performing communication control relating to a user terminal that transmits and receives user information via a first communication path and a second communication path, the first communication path being provided for a first control node in one or a plurality of slices that are virtualized networks generated on a network infrastructure, and the second communication path being provided for a second control node different from the first control node in one or a plurality of slices that are virtualized networks generated on a network infrastructure, the communication control device comprising:
a change request acquiring unit that acquires a change request relating to changing of the first and second communication paths relating to the user terminal; and
a communication processing unit that performs a process relating to changing of the first and second communication paths while forming a state in which the first and second communication paths before change and the changed communication path are compatible with each other,
wherein the communication processing unit performs a process of establishing the changed communication path and completes the establishment, and then performs a process of releasing the first and second communication paths before the change, thereby establishing a state in which the first and second communication paths before the change and the changed communication path are compatible, and
wherein the communication processing unit changes the communication path to the changed communication path provided for a first control node different from the second control node and a third control node before the change, and switches functions of both the first and second communication paths before the change to the changed communication path, and a number of the communication paths after the change is smaller than a total number of the first and second communication paths.

2. A communication control method using a communication control device performing communication control relating to a user terminal that transmits and receives user information via a first communication path and a second communication path, the first communication path being provided for a first control node in one or a plurality of slices that are virtualized networks generated on a network infrastructure, and the second communication path being provided for a second control node different from the first control node in one or a plurality of slices that are virtualized networks generated on a network infrastructure, the communication control method comprising:
a change request acquiring step of acquiring a change request relating to changing of the first and second communication paths relating to the user terminal; and
a communication processing step of performing a process relating to changing of the first and second communication paths while forming a state in which the communication path before change and the changed communication path are compatible with each other,
wherein the communication processing step performs a process of establishing the changed communication path and completes the establishment, and then performs a process of releasing the first and second communication paths before the change, thereby establishing a state in which the first and second communication paths before the change and the changed communication path are compatible, and
wherein the communication processing step changes the communication path to the changed communication path provided for a first control node different from the second control node and a third control node before the change, and switches functions of both the first and second communication paths before the change to the changed communication path, and a number of the communication paths after the change is smaller than a total number of the first and second communication paths.

* * * * *